US012380152B2

(12) United States Patent
Baker et al.

(10) Patent No.: US 12,380,152 B2
(45) Date of Patent: Aug. 5, 2025

(54) FINE-GRAINED PERMISSION MODELS FOR ONTOLOGY DATA

(71) Applicant: Palantir Technologies Inc., Denver, CO (US)

(72) Inventors: James Baker, Maidenhead (GB); Xavier Falco, London (GB); Samuel Flavio Barroso Souza, London (GB); Helen Yu, New York, NY (US); Amr Al Mallah, Tacoma, WA (US); Yixun Xu, Jersey City, NJ (US); Arseny Bogomolov, Arlington, VA (US)

(73) Assignee: Palantir Technologies Inc., Denver, CO (US)

( * ) Notice: Subject to any disclaimer, the term of this patent is extended or adjusted under 35 U.S.C. 154(b) by 0 days.

(21) Appl. No.: 18/642,464

(22) Filed: Apr. 22, 2024

(65) Prior Publication Data
US 2024/0354326 A1  Oct. 24, 2024

Related U.S. Application Data

(60) Provisional application No. 63/461,143, filed on Apr. 21, 2023.

(51) Int. Cl.
*G06F 16/23* (2019.01)
*G06F 16/36* (2019.01)
*G06F 21/62* (2013.01)

(52) U.S. Cl.
CPC ........ *G06F 16/367* (2019.01); *G06F 16/2336* (2019.01); *G06F 16/2365* (2019.01); *G06F 21/6218* (2013.01)

(58) Field of Classification Search
CPC ............. G06F 16/367; G06F 16/2336; G06F 16/2365; G06F 21/6218
See application file for complete search history.

(56) References Cited

U.S. PATENT DOCUMENTS

| | | | |
|---|---|---|---|
| 6,988,109 B2 * | 1/2006 | Stanley | G06F 16/20 |
| 8,015,143 B2 * | 9/2011 | Estes | G06F 16/2425 706/18 |
| 9,569,070 B1 | 2/2017 | Ma et al. | |
| 9,626,158 B1 * | 4/2017 | Ben-Tzur | G06F 3/0482 |

(Continued)

OTHER PUBLICATIONS

U.S. Appl. No. 18/440,724, Non-Final Office Action, Aug. 28, 2024.

(Continued)

*Primary Examiner* — Eliyah S. Harper
(74) *Attorney, Agent, or Firm* — Duane Morris LLP

(57) ABSTRACT

A system for enabling granular access control over ontology data and related methods are disclosed. The system is programmed to receive data source updates from data sources having respective sets of permissions for access control, transform the data source updates to changes to an ontology, and control access to the ontology based on the sets of permissions. The system is further programmed to receive a specification of one or more rules referencing attributes of user accounts or properties of ontology entities and corresponding one or more lists of permissions. The system is programmed to then enforce a security policy based on the specification to further control access to the ontology.

20 Claims, 12 Drawing Sheets

(56) References Cited

U.S. PATENT DOCUMENTS

| | | | |
|---|---|---|---|
| 9,712,576 B1* | 7/2017 | Gill | G06N 5/04 |
| 10,789,263 B2 | 9/2020 | Beard et al. | |
| 10,803,106 B1 | 10/2020 | Beard et al. | |
| 11,816,156 B2 | 11/2023 | Tonkin | |
| 2006/0165040 A1* | 7/2006 | Rathod | G06Q 10/10 |
| | | | 370/335 |
| 2008/0086498 A1* | 4/2008 | Sureka | G06F 16/28 |
| | | | 707/999.102 |
| 2012/0197934 A1 | 8/2012 | Zhang et al. | |
| 2014/0108461 A1* | 4/2014 | B'Far | G06F 16/252 |
| | | | 707/794 |
| 2015/0227598 A1 | 8/2015 | Hahn et al. | |
| 2015/0293955 A1 | 10/2015 | Dickey | |
| 2016/0085515 A1* | 3/2016 | Ben-Tzur | G06F 8/34 |
| | | | 717/109 |
| 2016/0085516 A1* | 3/2016 | Ben-Tzur | G06F 16/972 |
| | | | 717/109 |
| 2016/0110408 A1 | 4/2016 | Madhavarapu et al. | |
| 2016/0224600 A1 | 8/2016 | Munk | |
| 2016/0255139 A1* | 9/2016 | Rathod | H04L 51/046 |
| | | | 709/203 |
| 2016/0301753 A1 | 10/2016 | Auch et al. | |
| 2017/0193021 A1* | 7/2017 | Deng | G06F 8/63 |
| 2017/0235848 A1* | 8/2017 | Van Dusen | G06Q 10/101 |
| | | | 705/12 |
| 2018/0027006 A1* | 1/2018 | Zimmermann | H04L 63/0227 |
| | | | 726/11 |
| 2019/0102430 A1* | 4/2019 | Wang | G06N 7/01 |
| 2019/0347343 A1 | 11/2019 | Fink et al. | |
| 2021/0034614 A1 | 2/2021 | Kothari et al. | |
| 2021/0209249 A1* | 7/2021 | Hoffer | G16H 50/20 |
| 2023/0334080 A1* | 10/2023 | Tonkin | G06N 5/022 |
| 2024/0296181 A1 | 9/2024 | Busany et al. | |
| 2024/0354326 A1* | 10/2024 | Baker | G06F 21/6227 |
| 2024/0354567 A1* | 10/2024 | Duggal | G06N 3/006 |

OTHER PUBLICATIONS

U.S. Appl. No. 18/440,724, filed Feb. 13, 2024.
U.S. Appl. No. 18/642,456, filed Apr. 22, 2024.
U.S. Appl. No. 18/642,459, filed Apr. 22, 2024.
U.S. Appl. No. 18/744,290, filed Jun. 14, 2024.
U.S. Appl. No. 18/769,002, filed Jul. 10, 2024.
Sethi, Raghav, et al. "Presto: SQL on everything." 2019 IEEE 35th International Conference on Data Engineering (ICDE), https://doi.org/10.1109/icde.2019.00196, Apr. 2019, 12 pages.
Anonymous: "Overview—Palantir Foundry", Jan. 31, 2023 (Jan. 31, 2023), pp. 1-4, XP093205277, Retrieved from the Internet: URL: https://web.archive.org/web/20230131034452/https://www.palantir.com/docs/foundry/platform-overview/overview/.
Anonymous: "Data integration Overview—Palantir", May 18, 2022 (May 18, 2022), pp. 1-2, XP093205977, Retrieved from the Internet: URL: https://web.archive.org/web/20220518064333/https://www.palantir.com/docs/foundry/data-integration/overview/.
Higgins Andrew et al.: "How Palantir Foundry Helps Customers Build and Deploy AI-Powered Decision-Making Applications I AWS Partner Network (APN) Blog", Apr. 12, 2022 (Apr. 12, 2022), pp. 1-10, XP093205395, Retrieved from the Internet: URL: https://web.archive.org/web/20220412042602mp_/https://aws.amazon.com/blogs/apn/how-palantir-foundry-helps-customers-build-and-deploy-ai-powered-decision-making-applications/.
Anonymous: "Object Storage V1 (Phonograph)—Palantir", Jan. 29, 2023 (Jan. 29, 2023), pp. 1-3, XP093209496, Retrieved from the Internet: URL: https://web.archive.org/web/20230129030331/https://www.palantir.com/docs/foundry/ontology-manager/object-storage-v1/.
Anonymous: "Save changes to the Ontology—Palantir", May 23, 2022 (May 23, 2022), pp. 1-4, XP093205386, Retrieved from the Internet: URL: https://web.archive.org/web/20220523050510/https://www.palantir.com/docs/foundry/ontology-manager/save-changes/.
Anonymous: "Permissions—Palantir Foundry", May 21, 2022 (May 21, 2022), pp. 1-6, XP093205376, Retrieved from the Internet: URL: https://web.archive.org/web/20220521182741/https://www.palantir.com/docs/foundry/ontology-manager/permissions/.
Extended European Search Report in EP Application No. 24171562.2, dated Oct. 14, 2024, in 17 pages.
Extended European Search Report in EP Application No. 24171618.2, dated Oct. 14, 2024, in 15 pages.
Extended European Search Report in EP Application No. 24171617.4, dated Oct. 14, 2024, in 15 pages.

* cited by examiner

| Time | Current datasource row state | User edit | Final object state |
|---|---|---|---|
| T0 | columns = {<br>pk_column = pk1,<br>col1 = val1,<br>col2 = val2} | | properties = {<br>pk_column = pk1,<br>col1 = val1,<br>col2 = val2},<br>deleted = false |
| T1 | columns = {} | | properties = {},<br>deleted = true |
| T2 | columns = {<br>pk_column = pk1,<br>col1 = val1,<br>col2 = val2} | | properties = {<br>pk_column = pk1,<br>col1 = val1,<br>col2 = val2},<br>deleted = false |
| T3 | columns = {<br>pk_column = pk1,<br>col1 = val1,<br>col2 = val2} | Modify object:<br>properties = {<br>pk_column = pk1,<br>col2 = newVal2} | properties = {<br>pk_column = pk1,<br>col1 = val1,<br>col2 = newVal2},<br>deleted = false |
| T4 | columns = {} | | properties = {},<br>deleted = true |
| T5 | columns = {<br>pk_column = pk1,<br>col1 = val1,<br>col2 = val2} | | properties = {<br>pk_column = pk1,<br>col1 = val1,<br>col2 = newVal2},<br>deleted = false |
| T6 | columns = {<br>pk_column = pk1,<br>col1 = newVal1,<br>col2 = val2} | | properties = {<br>pk_column = pk1,<br>col1 = newVal1,<br>col2 = newVal2},<br>deleted = false |

FIG. 5A

| Time | Current datasource row state | User edit | Final object state |
|---|---|---|---|
| T7 | columns = { pk_column = pk1, col1 = newVal1, col2 = val2} | Delete object | properties = {}, deleted = true |
| T8 | columns = { pk_column = pk1, col1 = newVal1, col2 = val2, col3 = null} | | properties = {}, deleted = true |
| T9 | columns = { pk_column = pk1, col1 = newVal1, col2 = val2, col3 = null} | Create object: properties = { pk_column = pk1, col3 = val3} | properties = { pk_column = pk1, col1 = null, col2 = null, col3 = val3}, deleted = false |
| T10 | columns = { pk_column = pk1, col1 = newVal1, col2 = newVal2, col3 = newVal3} | | properties = { pk_column = pk1, col1 = null, col2 = null, col3 = val3}, deleted = false |
| T11 | columns = { pk_column = pk1, col1 = newVal1, col2 = newVal2, col3 = newVal3} | Modify object: properties = { pk_column = pk1, col2 = newVal22} | properties = { pk_column = pk1, col1 = null, col2 = newVal22, col3 = val3}, deleted = false |
| T12 | columns = {} | | properties = { pk_column = pk1, col1 = null, col2 = newVal22, col3 = val3}, deleted = false |

FIG. 5B

| Time | Current datasource row state | User edit | Final object state |
|---|---|---|---|
| T13 | columns = {<br>pk_column = pk1,<br>col1 = newVal1,<br>col2 = newVal2,<br>col3 = newVal3} | Delete object | properties = {},<br>deleted = true |
| T14 | columns = {<br>pk_column = pk1, col1 = newVal1,<br>col2 = newVal2,<br>col3 = newVal3} | Modify object: properties = {<br>pk_column = pk1, col2 = newVal2, col3 = val3} | properties = {},<br>deleted = true |

FIG. 5C

FINE-GRAINED PERMISSION MODELS FOR ONTOLOGY DATA

BENEFIT CLAIM

This application claims the benefit under 35 U.S.C. § 119(e) of U.S. Provisional Application No. 63/461,143, titled "ONTOLOGY ARCHITECTURE" and filed on Apr. 21, 2023, the entire contents of which are hereby incorporated by reference as if fully set forth herein.

TECHNICAL FIELD

The present disclosure relates to ontology-based database operations, and more particularly to database operations related to indexing, conflict resolution, versioning, and access control.

BACKGROUND

Data originating from data sources can be organized or structured according to an ontology, which facilitates understanding of and access to the data. The ontology can be backed by databases where the data is stored. It would be helpful to properly manage the databases while fully supporting operations of the ontology.

SUMMARY

The appended claims may serve as a summary of the invention.

BRIEF DESCRIPTION OF THE DRAWINGS

Example embodiments will now be described by way of non-limiting examples with reference to the accompanying drawings, in which:

FIG. 5A illustrates part of an example process of resolving conflicts between data source updates and user edits using the conflict resolution strategy that prioritizes user edits.

FIG. 5B illustrates part of an example process of resolving conflicts between data source updates and user edits using the conflict resolution strategy that prioritizes user edits.

FIG. 5C illustrates part of an example process of resolving conflicts between data source updates and user edits using the conflict resolution strategy that prioritizes user edits.

DETAILED DESCRIPTION OF CERTAIN EMBODIMENTS

Figure 1:
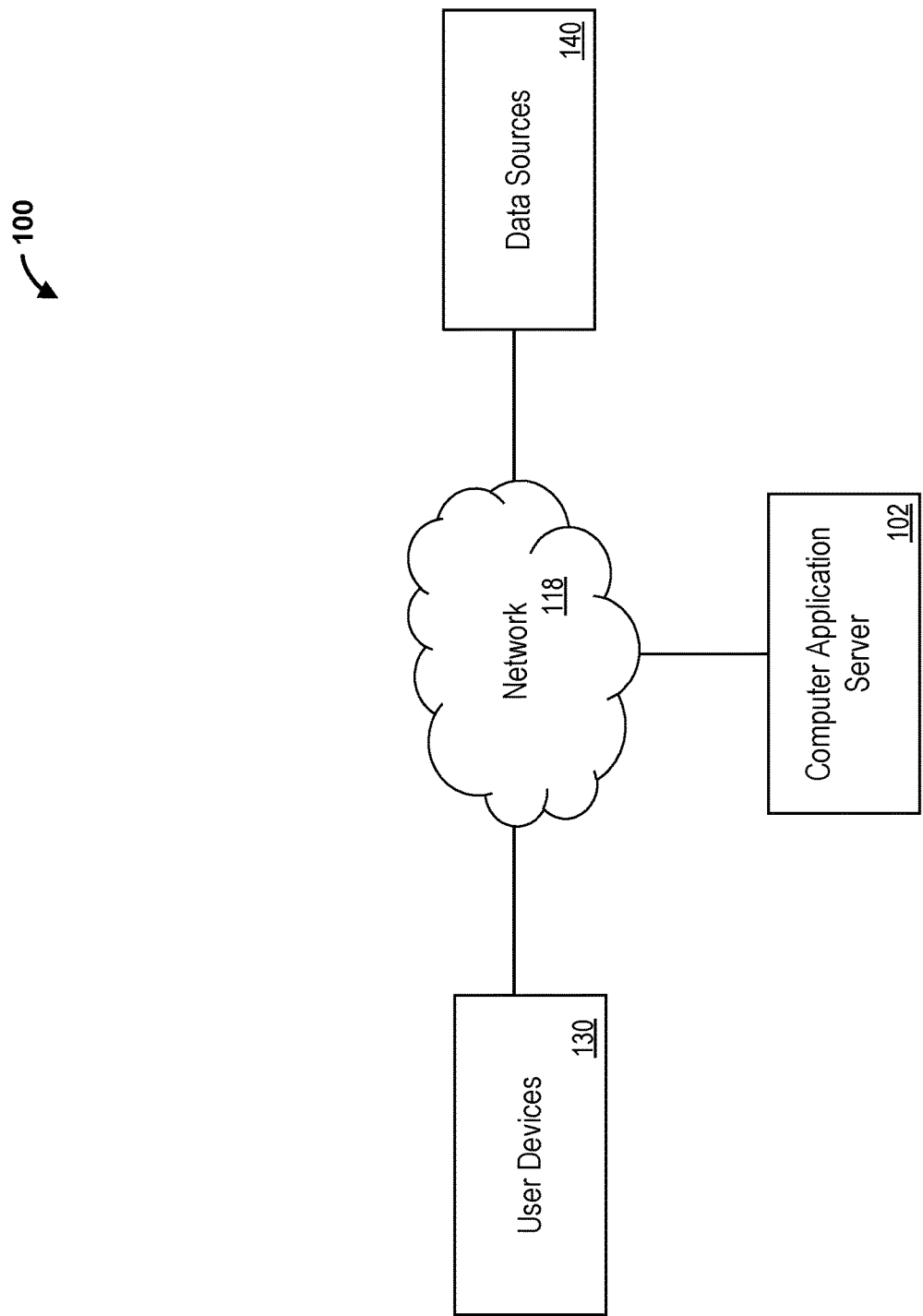
FIG. 1 illustrates an example networked computer system in which various embodiments may be practiced.

In the following description, for the purposes of explanation, numerous specific details are set forth in order to provide a thorough understanding of the example embodiment(s) of the present invention. It will be apparent, however, that the example embodiment(s) may be practiced without these specific details. In other instances, well-known structures and devices are shown in block diagram form in order to avoid unnecessarily obscuring the example embodiment(s).

1. GENERAL OVERVIEW

A system for enabling granular access control over ontology data and related methods are disclosed. The system is programmed to receive data source updates from data sources having respective sets of permissions for access control, transform the data source updates to changes to an ontology, and control access to the ontology based on the sets of permissions. The system is further programmed to receive a specification of one or more rules referencing attributes of user accounts or properties of ontology entities and corresponding one or more lists of permissions. The system is programmed to then enforce a security policy based on the specification to further control access to the ontology.

In some embodiments, the system is programmed to manage the ontology, which includes definitions of ontology entity types, and ontology entities that are instantiated from the ontology entity types. An ontology entity type is generally an object type or a link type and has one or more properties. For example, an ontology object type can correspond to a person and has properties corresponding to a person's residence and occupation, and an ontology link type can correspond to a relationship between two people.

In some embodiments, the system is programmed to receive original data from the data sources. Each data source can be represented as a dataset that has a specific schema, which can be mapped to specific ontology entity types to enable transformation of the original data from the data source to ontology entities of the specific ontology entity types. For example, a first dataset can have columns that correspond to a person's home address and job, and those columns could be mapped to a first set of properties of the person object type. A second dataset can have columns that correspond to a person's gender and age, and those columns could be mapped to a second set of properties of the person's object type. Each data source can also have a specific access control mechanism that determines how different user accounts can access different parts of the data source. For example, the access control mechanism for the first data source can grant only read access to all rows to a first set of user accounts, while the access control mechanism for the second data source can grant all access to all rows to a second set of user accounts.

In some embodiments, the system is programmed to control access to ontology entities of an ontology entity type based on the access control mechanisms for the data sources to which the ontology entity type is mapped. For example, when a person object originates from both the first data source and the second data source, the system is programmed to control access to the person object based on the access control mechanisms for both the first data source and the second data source.

In some embodiments, the system is programmed to also receive access requests to access the ontology from user accounts, including requests to create or remove ontology entities or view or modify ontology entities. To process these access request, the system is programmed to allow the creation of granular security policies. Each granular security policy can specify a combination of rules, and each rule can specify a relationship between two out of an attribute pf a user account, a property of an ontology entity, or a value, and a corresponding set of permissions. The system is programmed to further apply each granular security policy by determining whether the combination of rules is satisfied and if so enforce the combination of the sets of permissions. For example, a security policy can specify that when a user account has residence attribute having a value of "Japan" and an ontology entity has a sale location property having a value of "Japan", the user account is allowed to view the address property and the price property of the ontology entity.

The system disclosed herein has several technical benefits. An ontology provides a structure to any large volume of data, which facilitates user interaction with the data. By integrating the access control mechanisms for the data sources where the ontology data can originate, the system reduces the chance of conflict in managing access control for the ontology. By supporting granular security policies, the system enhances the flexibility and accuracy of the access control for the ontology, leading to highly effective data security management.

2. EXAMPLE COMPUTING ENVIRONMENTS

FIG. 1 illustrates an example networked computer system in which various embodiments may be practiced. FIG. 1 is shown in simplified, schematic format for purposes of illustrating a clear example and other embodiments may include more, fewer, or different elements.

In some embodiments, a networked computer system 100 comprises a computer server ("server") 102, one or more user devices 130, and one or more data sources 140, which are communicatively coupled through direct physical connections or via a network 118.

In some embodiments, the server 102 is programmed or configured to manage datasets representing data sources, which are transformed to ontology data, and databases representing the ontology data in multiple forms. The management comprises integrating multiple sources of change to the ontology data, representing changes to the ontology data in different forms, and allow access to the ontology data in various granularities. The server 102 can comprise any centralized or distributed computing facility with sufficient computing power in data processing, data storage, and network communication for performing the above-mentioned functions.

In some embodiments, each user device of the one or more user devices 130 is programmed to submit access requests to the server 102 to access the ontology and receive replies to the access requests from the server 102. The access requests can include reading, writing, adding, or deleting ontology data. Each user device can comprise a personal computing device, such as s desktop computer, laptop computer, tablet computer, smartphone, or wearable device.

In some embodiments, each data source of the one or more data sources 140 is programmed to provide original data to the server 102, which represents the original data as datasets, or accept changes to the original data based on updates to the datasets from the server 102. Each data source can generally be similar to the server 102 and comprise any computing facility with sufficient computing power in data processing, data storage, and network communication for performing the above-mentioned functions.

The network 118 may be implemented by any medium or mechanism that provides for the exchange of data between the various elements of FIG. 1. Examples of the network 118 include, without limitation, one or more of a cellular network, communicatively coupled with a data connection to the computing devices over a cellular antenna, a near-field communication (NFC) network, a Local Area Network (LAN), a Wide Area Network (WAN), or the Internet, a terrestrial or satellite link.

In some embodiments, the server 102 is programmed or configured to receive original data from the one or more data sources 140. The server 102 is programmed to set up datasets representing the one or more data sources 140 and transforming data in the datasets to ontology data. The server 102 is programmed to further represent the ontology data in multiple databases. On the other hand, the server 102 is programmed to receive access requests from the one or more user devices 130, including user edits to the ontology data. The server 102 is programmed to also integrate these user edits into the multiple databases. The server 102 can also be programmed to materialize these user edits into datasets and transform data in these datasets for integrating into the datasets representing the one or more data sources 140 and ultimately updating the one or more data sources 140.

3. FUNCTIONAL DESCRIPTIONS

Figure 2:
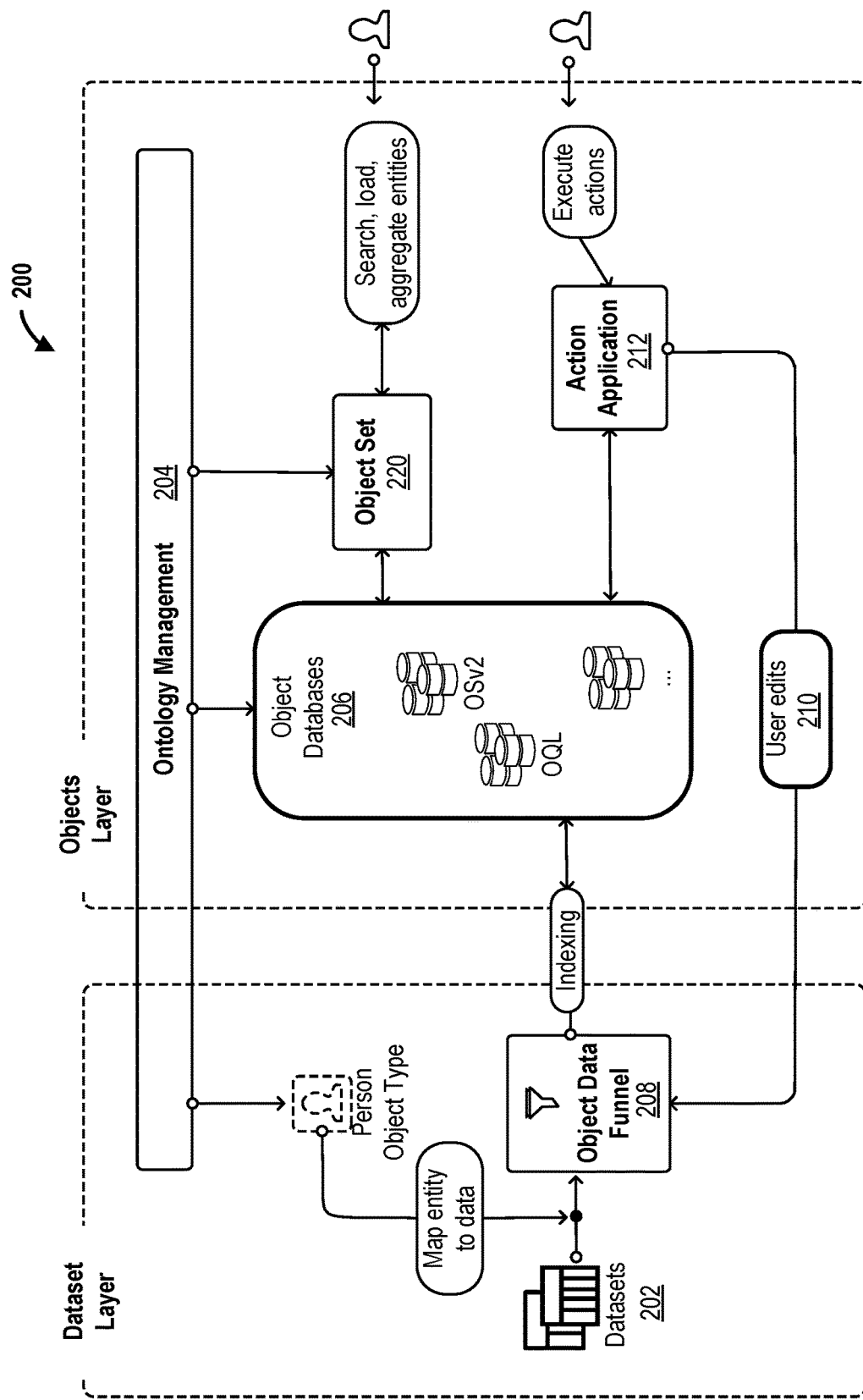
FIG. 2 illustrates an example set of components of and workflows managed by a computer application server ("server").

FIG. 2 illustrates an example set of components of and workflows managed by the server 102. In some embodiments, the server 102 is programmed to receive original data from various data sources and maintain them as datasets 202. The data sources can include file systems, database management systems, streaming sources, or blob stores, for example. A dataset is a wrapper around a collection of files which are stored in a specific file system. The datasets 202 can contain mainly structured and semi-structured data, from which one or more schemas can be inferred. Each schema specifies how a file is to be parsed into a specific format, such as a tabular format having rows and columns.

In some embodiments, the server 102 is programed to establish a mapping between the group of datasets and an ontology via the ontology management 204 as a service. The ontology includes definitions for all relevant object types, such as people, computers, networks, documents, or events, with objects being instantiated from the object types. The ontology can also separately include definitions for all relevant link types, such as similarities or dependencies, with links being instantiated from the link types. Specific structures, such as properties or versions, and specific operations, such as revision, access control, or provenance tracking at the object, link, or property level (or corresponding row or column level) apply to all object types and all link types. The object types and link types are considered as "ontology entity types". The objects and the links are considered as "ontology entities", which encompass the properties. The ontology and relevant metadata are considered as "ontology data". The ontology management 204 can manage definitions for an application programming interface (API) that allows access to the ontology entities and the structures. The mapping between the group of datasets and the ontology would associate, for each dataset, one or more ontology entity types to which the dataset can be transformed. The server 102 can be further programmed to establish, for each dataset, a transformation between a schema for the dataset and definitions for the one or more ontology entity types to which the dataset is associated. For example, a column in the schema can be transformed to a property of an object type and vice versa. When more original data is received from the various data sources and maintained as updated datasets, any updates in the updated datasets can be readily converted to ontology data according to the transformation.

In some embodiments, the server 102 is programmed to store representations of ontology entity types and thus ontology entities in one or more ontology databases 206 (also called "object databases") via an ontology data funnel 208 (also called "object data funnel") as a service. The object data funnel 208 implements an indexing process of making the datasets as transformed to corresponding ontology data available in the object databases 206 for fast retrieval in response to user queries. The fast retrieval is achieved by the organization of the ontology, the representation of the ontology data in multiple object databases having different capabilities, and the availability of indices of ontology data and a mapping between the ontology and the object databases 206.

As links connect objects, link information could be considered as part of an object and vice versa. Therefore, representation of link types and that of object types can affect each other. In some embodiments, the server 102 is programmed to represent an object type or link type in different ways in different object databases in accordance with the different capabilities of the different object databases. As one example, in a relational object database, an object may be represented as a row while a property of an object may be represented as a column, which enables fast identification of objects that have certain property values. As another example, in a graph object database, an object may be represented as a node and a link between two objects may be represented as an edge, which enables fast exploration of relationships or links among objects. In other examples, the object databases can specialize in representing a property in a compressed form or an encrypted form, or representing properties in a specific order to form an index.

In some embodiments, the server 102 can be programed to establish the mapping between the object databases and the ontology also via the ontology management 204. This mapping would associate, for each ontology entity type, one or more object databases to which the ontology entity type can be transformed. The server 102 can be further programmed to establish, for each ontology entity type, a transformation between a definition for the ontology entity type and one or more schemas for the one or more object databases to which the ontology entity type is associated. For example, a property of an object type can be transformed to a column in a schema and vice versa. Subsequently, any changes to the ontology can be readily converted to changes in the object databases 206 according to this transformation.

In some embodiments, the server 102 is programmed to represent each ontology entity type in at least one of the object databases 206, with the one being considered as the canonical object database for the ontology entity type. The server 102 can be programmed to also represent the ontology entity type in one or more secondary object databases. As changes are made to the ontology data, the indices could be updated as part of the indexing process implemented by the object data funnel 208. In addition, the server 102 can be programmed to represent each ontology entity in different versions in the object databases 206 and preserve versioning consistency across the object databases 206. The availability of a particular version in the canonical object database can be used to determine whether a particular version of an ontology entity is to be served in response to user queries.

In some embodiments, the server 102 is programmed to manage not only objects or links including components originating from only one data source but also objects including components originating from multiple data sources. Each ontology entity that originates from multiple data sources is referred to as a multi-data source ontology entity ("MDO"). An MDO typically has these components that correspond to respective data sources and are separately represented in the object databases 206. For example, separate components could be stored as separate columns in an object database. The server 102 can be further programmed to control access to the ontology data, from the ontology level down to the component level. Such access control can be extended to the object databases 206 where the ontology data are represented.

In some embodiments, the server 102 is programmed to receive queries from a user device associated with a user account and execute the query via the ontology set 220 (also called "object set") as a service. The object set 220 can support the API for querying the ontology noted above. The API would include a set of functions that operate on ontology entity types or ontology properties, such as filters or aggregators. These functions generally correspond to read requests to view ontology data, which require read access to the object databases 206. These functions can also be called to process ontology data before actions are applied, as discussed below. The actions correspond to write requests to modify ontology data, which require write access to the object databases 206.

In some embodiments, the server 102 is programmed to receive an action comprising user edits 210 to ontology data from a user device, and apply the action via the action application 212 as a service. In this ontology context, an action specifies user logic to change data related to one or more ontology entities and is to be performed as a single transaction. In other embodiments, the server 102 is programmed to receive updates to the datasets 202 from the data sources. As noted above, when such updates are received, they can be readily converted to corresponding changes to the ontology data according to the transformation.

In some embodiments, the server 102 is programmed to store representations of ontology data in the object databases 206 via the object data funnel 208, as discussed above. The object data funnel 208 can implement the indexing process by indexing only changes and sending the indexed changes to the object databases 206. As the changes can originate from the user edits 210 or data source updates (that turn into dataset updates), the server 102 can be programmed to resolve any conflicts in the received changes before indexing the changes and sending the indexed changes via the object data funnel 208 to the object databases 206.

3.1. Processing User Edits to Ontology Data

In some embodiments, the server 102 is programmed to allow users to make changes to ontology data as user edits by creating actions, as discussed above. An action specifies user logic to make these changes and is to be performed as a single transaction. For example, an action type that defines an Assign Employee action can specify changing the Role property value for a given Employee object based on user input and creating a link between the Employee object and a new Manager object based on specific rules. As illustrated in this example, an action can include a series of user edits, with each corresponding to one change, such as updating the value of one property or deleting an object. Each user edit can be represented as a record that indicates a primary key identifying an object or a link in the ontology, an order, change information describing what is being changed, or other relevant data.

In some embodiments, the server 102 is programmed to receive a request to apply an action to change ontology data from a user device. The server 102 can be programmed to store the request in an action queue together with a request timestamp, such as coordinated universal time (UTC) offset, to support user edits included in multiple actions to be applied. The request timestamp is associated with all the user edits included in the action. The server 102 can also be programmed to receive requests to read or view ontology data and store these requests together with request timestamps. All requests are processed based on the corresponding request timestamps. This ensures that, for example, when an object read occurring as part of an ontology query is requested after an object modification is made, the result of the object read is guaranteed to reflect the user edits in the user modification. The server 102 is further programmed to dequeue the requests at least from the action queue continuously or based on a predetermined schedule or triggers.

3.2. Indexing Data Changes to Object Databases

Figure 3:
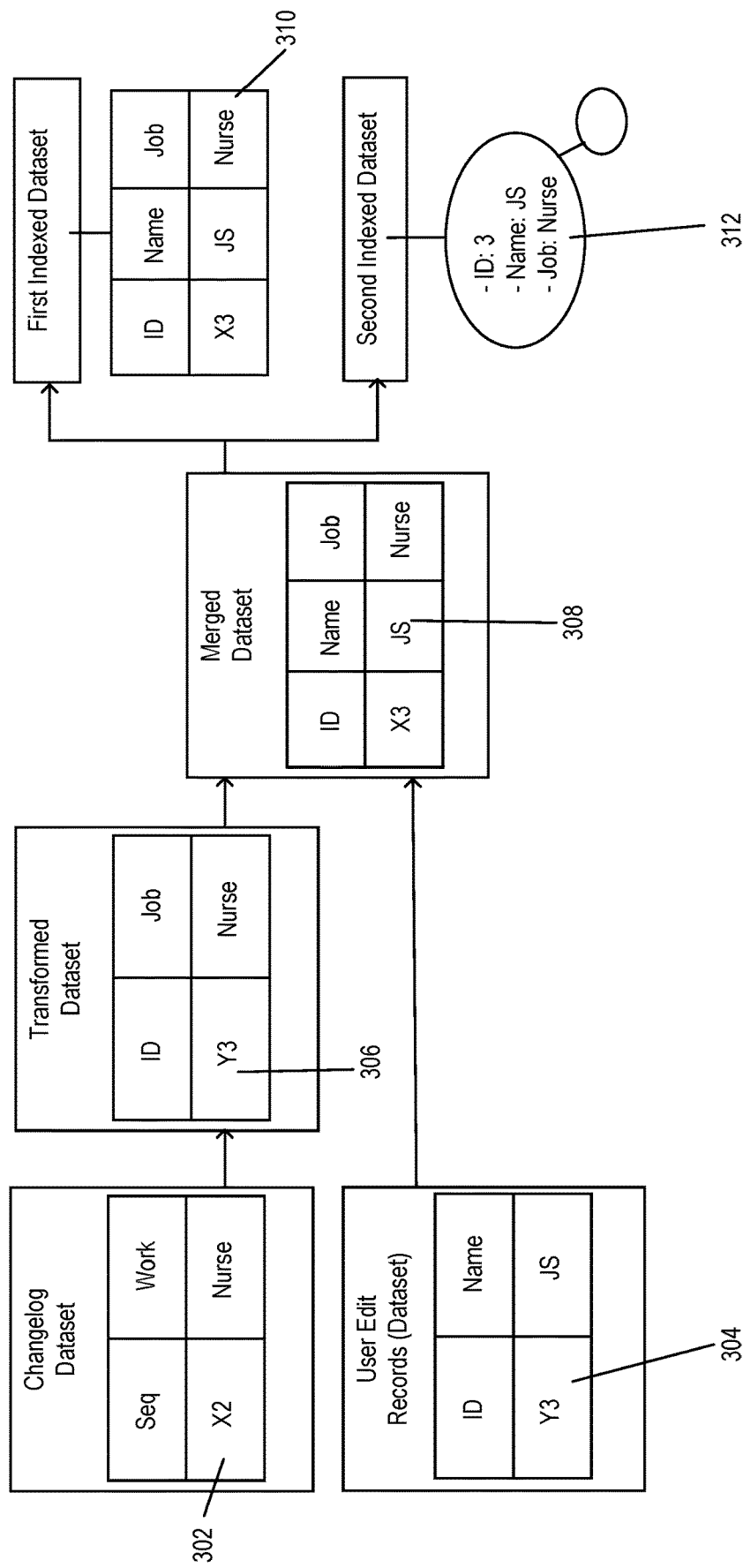
FIG. 3 illustrates an example view of an indexing pipeline implemented by the server via the object data funnel.

FIG. 3 illustrates an example view of an indexing pipeline implemented by the server 102 via the object data funnel 208. FIG. 3 is shown in simplified, schematic format for purposes of illustrating a clear example and other embodiments may include more, fewer, or different elements connected in various manners, or different values within the different elements.

3.2.1. Creating Changelog Datasets for Data Source Updates

In some embodiments, the server 102 is programmed to receive new original data from a data source and compute the difference or change from what is already in the data source via the corresponding dataset. For example, when the dataset contains rows and columns, the difference could be an addition, removal, or update of a row (with a new value for a column). The server 102 is programmed to then create a changelog dataset. The changelog dataset can indicate, for each difference, a primary key of the affected row, an order (e.g., a change timestamp), change information describing what is being changed, or other relevant data. For example, in FIG. 3, a changelog dataset contains a row 302 having "X2" as the value for the Seq column, and "Nurse" as the updated value for the Work column. The server 102 can be programmed to maintain a single changelog dataset at a time or one changelog dataset for each data source. Each changelog dataset can be developed through append transactions that add new files indicating the computed differences.

3.2.2. Merging Data Source Updates and User Edits

In some embodiments, the server 102 is programmed to combine data source updates and user edits, which constitute two sources of change to the object databases 206. The data source updates can come from a changelog dataset, and the user edits can come from an action queue. For example, in FIG. 3, a set of user edit records in the action queue contains a record 304 having "Y3" as the value for the ID field and "JS" as the updated value for the Name field. This record corresponds to a request to update the value of the Name property of a Person object with a primary key of "Y3" for the ID property in the ontology. The user edit records can also be stored into a user edit dataset for downstream processing. The server 102 can be configured to perform this combination or merge of data source updates and user edits based on a predetermined schedule or triggers. Example triggers include when a certain amount of data in either source of change has been received or detected or when a certain period of time has passed. It is possible that when a trigger runs, only one of the sources of change is available for the merge.

In some embodiments, the server 102 is programmed to merge the data source updates and the user edits into a merged dataset that enables efficient indexing into the object databases 206. While the user edits would generally refer to ontology data, such as an object ID, the data source updates involve original data in the data sources. The server 102 thus can be programmed to convert the changelog dataset into a transformed dataset that refers to the ontology data using the transformation discussed above. For example, in FIG. 3, the transformed dataset corresponding to the changelog dataset contains a row 306 having "Y3" as the value for the ID column and "Nurse" as the updated value for the Job column, which respectively correspond to the ID property and the Job property of a Person object.

In some embodiments, the server 102 is programmed to join the transformed dataset and the set of user edit records (or the user edit dataset) into a merged dataset based on primary keys each identifying an object or a link in the ontology. For example, in FIG. 3, after the transformation, since the row 306 and the record 304 have a common value for the primary key, they can be joined together to create the merged dataset that has a row 308 having "Y3" as the value for the ID column, "JS" as the updated value for the Name column, and "Nurse" as the updated value for the Job column. The merged dataset can be incorporated back into the data sources. The merged dataset can contain one row for each ontology entity that includes all the compatible changes being made to the ontology entity. When certain changes respectively from the two sources of change are conflicting and thus incompatible, the server 102 is configured to resolve the conflict, as further discussed in Section 3.3.

3.2.3. Creating Index Data

In some embodiments, the server 102 is programmed to create an index dataset from the merged dataset for at least one of the object databases 206. These index datasets enable fast retrieval of representations of ontology data in the object databases 206. As discussed above, each ontology entity type can be represented in multiple object databases. The server 102 can be configured to first consult the mapping that indicate how each ontology entity type covered in the merged dataset is represented in multiple object databases. The server 102 can be further programmed to determine for which object databases the index datasets need to be generated from the merged dataset. As each object database has its set of capabilities and its approach of organizing data, the index datasets for different object databases can look different. For each object database, the server 102 can be configured to then consult the database schema and then create a corresponding index dataset in the format required by the object database.

In some embodiments, an index dataset comprises indices of the changes captured in the merged dataset to ontology entities that are represented in the corresponding object database. Each index can include a list of identifiers of the objects or links undergoing changes and the corresponding changes. The index dataset can additionally include a pointer to a specific location in the appropriate dataset for each of the affected object or link. For example, an index in an indexed dataset can indicate that for the Job property, a first object that has an updated value of "Nurse" has "Y3" as the value for the ID property and a second object that has the same updated value has "W9" as the value for the ID property. This index thus communicates the changes and also enables an efficient search of the ontology based on the Job property of the person object type. The index could also point to the dataset that gives rise to the object, which would contain the entire row corresponding to the object. In FIG. 3, the merged dataset leads to the first indexed dataset that facilitates finding an object that is represented as a row 310 having "JS" as the value for the Name column and "Nurse" as the value for the Job column in a first object database that is a relational database, and a second index dataset that facilitates finding t-the same object that is represented as a node 312 with having "JS" as the value for the Name attribute and "Nurse" as the value for the Job attribute in a second object database that is a graph database.

In some embodiments, the server 102 is programmed to apply an action immediately by dequeuing the request to apply, creating corresponding index data directly from the user edits in the action, and transmitting the index data to one or more object databases in real time. This process bypasses the persistence of the user edits via the user edit dataset or the merged dataset via the object data funnel 208. However, user edits are also persisted periodically, as discussed above. Therefore, index data can be created directly from the user edit records or from intermediary index datasets or other temporary files, based on the database schema for each object database. As actions are applied immediately and indexed into the object databases continuously, the user edits to be persisted into a merged dataset can generally already be indexed into the object databases. The merged dataset and a corresponding index dataset generally would not conflict with the index data or representation of the ontology data in the object database as long as the data source updates do not take precedence over the user edits but are merely verified against the user edits.

3.2.4. Preparing Changed Ontology Data for Querying

In some embodiments, the server 102 is programmed to transmit data from the index datasets to the appropriate object databases that can be queried. This approach can be analogized to the approach discussed in U.S. Pat. No. 11,169,507, where the updates from the data sources and the user edits can correspond to the log stream, the merged datasets can correspond to the hot storage associated with the indexers or the data stored in that hot storage, the index datasets can correspond to the indexed portions, and the object databases can correspond to the hot storage associated with the search nodes or the data stored in that hot storage. According to the approach discussed in the patent, some indexed portions can be stored in cold storage associated with the indexers, and a catalog can include only metadata or pointers to locations of the indexed portions in the cold storage instead of the actual indexed portions. The catalog is then consulted in response to a search request, and an appropriated indexed portion is then retrieved from the cold storage based on the consultation and transmitted to the hot storage associated with the search nodes. Therefore, while in some embodiments, the indexed datasets include the indexed portions as indices and are transmitted to the object databases according to a predetermined schedule or specific triggers, in other embodiments, some of the indices can be pushed to certain cold storage and transmitted to the object databases according to a similar catalog only in response to search requests. Example triggers for transmitting the index datasets include when a certain amount of data in one or more index datasets has become available or when a certain period of time has passed.

3.3. Resolving Conflicts Between User Edits and Data Source Updates

As discussed above, data source updates and user edits constitute two sources of change to the object databases. When certain changes are conflicting and thus incompatible, the server 102 is configured to resolve the conflict. In some embodiments, when a specific object or link with a primary key value is subject to conflicting changes from the data sources and user edits in a merged dataset, the server 102 is programmed to resolve the conflicts with a conflict resolution strategy. The merged dataset can include multiple changes associated with the primary key and different timestamps. The server 102 can be programmed to go through these changes in a chronological order in applying the conflict resolution strategy. The merged dataset can thus include one row for each ontology entity with all the changes to be made.

In some embodiments, the server 102 is programmed to adopt a conflict resolution strategy that prioritizes user edits. The strategy can enforce the following resolution rules. (1) Once an ontology entity is modified based on a user edit, the user edit remains effective until overridden by another user edit when the ontology entity is not being deleted. (2) Rule (1) holds except that a data source update to delete a corresponding row will be effective when the corresponding ontology entity was not created based on a user edit. (3) Rule (1) holds despite the ontology entity being possibly deleted and recreated again based on data source updates. (4) Once an ontology entity is created or deleted based on a user edit, all future data source updates to the ontology entity are ignored. Pursuant to these rules, the server 102 is programmed to consider data source updates to an ontology entity originally created based on a data source update until the object is deleted based on a user edit. Once a user edit is applied to a property of an ontology entity, the server 102 is programmed to receive further changes to the property only based on user edits.

Figure 4:
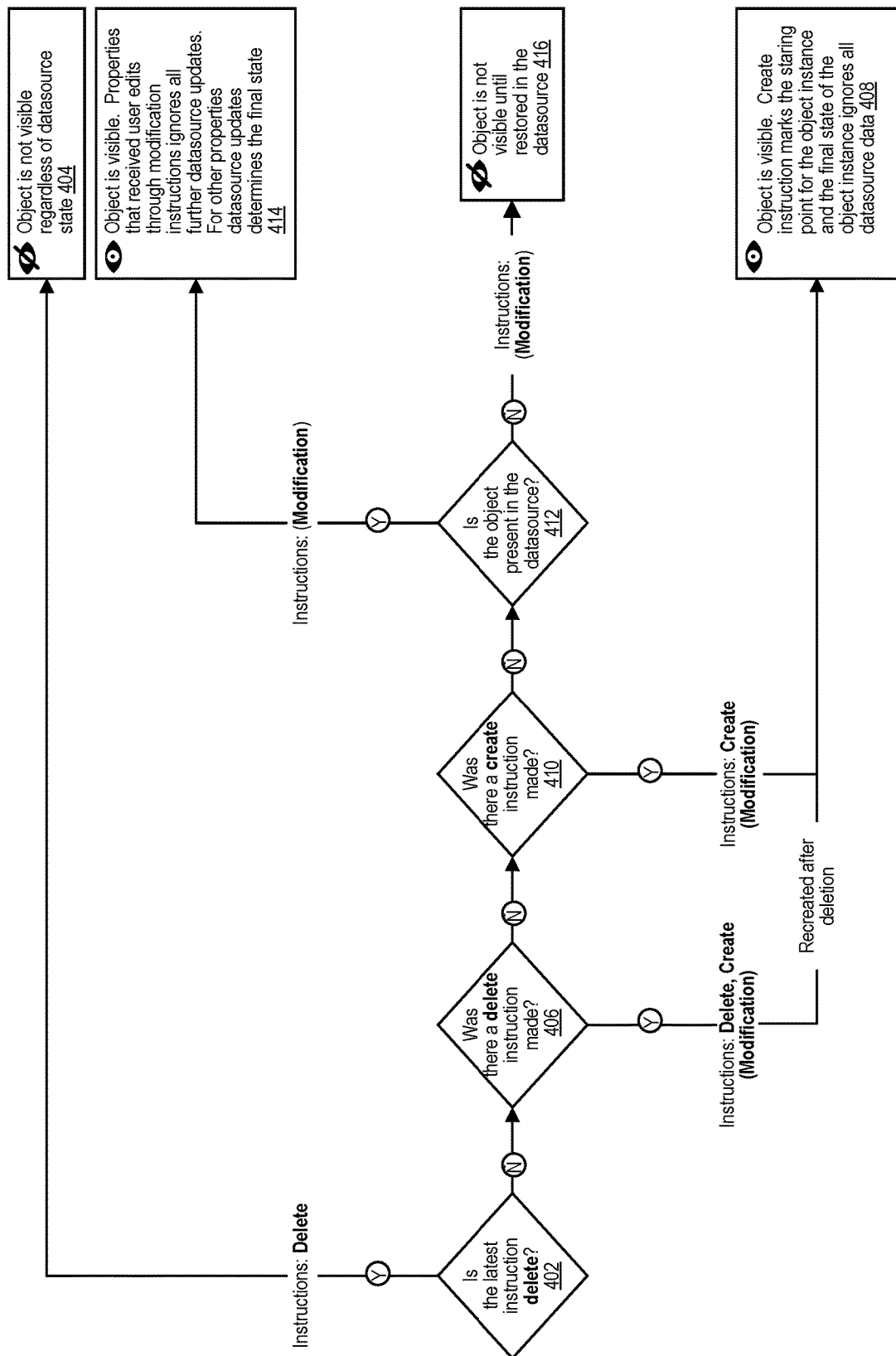
FIG. 4 illustrates an example framework for resolving conflicts between data source updates and user edits using the conflict resolution strategy that prioritizes user edits.

FIG. 4 illustrates an example framework for resolving conflicts between data source updates and user edits using the conflict resolution strategy that prioritizes user edits. In some embodiments, for each latest user edit, at step 402, the server 102 is programmed to determine whether this latest user edit is to delete an object from the ontology. In response to a positive determination, at step 404 the server 102 is programmed to conclude that the object is not visible in the ontology, regardless of whether any corresponding row is in one of the data sources. In response to a negative determination, which means that the latest user edit is to create or modify an object in the ontology, at step 406, the server 102 is programmed to determine whether there was a user edit to delete the object. In response to a positive determination, which means that the user edit is to recreate the, at step 408, the server 102 is programmed to conclude that the object is visible in the ontology, and ignore future data source updates to the object. In response to a negative determination, at step 410, the server 102 is programmed to determine whether there has been a user edit to create the object. In response to a positive determination, which means that the user edit is to initially create the object (after a data source update to delete the object), the server 102 similarly reaches step 408. In response to a negative determination, which means that the latest user edit is to modify an object that was not last created based on a user edit, at step 412, the server 102 is programmed to determine whether the object is present in the database. In response to a positive determination, which means that the object was created based on a data source update, at step 414, the server 102 is programmed to conclude that the object is visible in the ontology, and ignore future data source updates to properties that are being modified in the latest user edit. In response to a negative determination, which means that a modification is being attempted in the latest user edit to an object that has not been created or recreated in the ontology, at step 416, the server is programmed to conclude that the object does not exist and thus is not visible in the ontology.

FIGS. 5A, 5B, and 5C illustrate an example process of resolving conflicts between data source updates and user edits using the conflict resolution strategy that prioritizes user edits. In FIG. 5A, at time T0, there is a data source update to set a row with values for the col1 and col2 columns. Therefore, an object identified by the primary key of "pk1" is created in the ontology with values for the col1 and col2 properties. At time T1, there is a data source update to remove all columns. Therefore, the object is deleted from the ontology. At time T2, there is a data source update to set a row with values for the col1 and col2 columns. Therefore, the object is recreated in the ontology. At time T3, there is a user edit to modify the value of the col2 property. Therefore, the value of the col2 property of the object is changed in the ontology. At T4, there is a data source update to remove all columns. Therefore, the object is deleted from the ontology pursuant to Rule (2) noted above. At T5, there is a data source update to set a row with values for the col1 and col2 columns as well as the user edit made at T3 pursuant to Rules (1) and (3) noted above. Therefore, the conflict involving the property col2 is to be resolved by prioritizing user edits. The object is then recreated in the ontology with values for the col1 and col2 columns, where the value comes from the user edit. At time T6, there is a data source update to modify the value of the column col1 of the row. Therefore, the value of the col1 property of the object is changed.

In FIG. 5B, at time T7, there is a user edit to delete the object, and the user edit made at time T3 is no longer effective pursuant to Rule (1) noted above. Therefore, the object is deleted from the ontology. At time T8, there is a data source update to modify the value of the col3 column of the row against the user edit made at T7. Therefore, the conflict involving all the properties is to be resolved by prioritizing user edits. The object then remains deleted from the ontology pursuant to Rule (4) noted above. At time T9, there is a user edit to create the object with a value for the col3 property. Therefore, the object is recreated with a value for the property col3. At time T10, there is a data source change to modify the value of the col2 column of the row against the user edit made at time T9. Therefore, the conflict involving the col3 property is to be resolved by prioritizing user edits. The object then remains unchanged in the ontology pursuant to Rule (4). At time T11, there is a user edit to modify the value of the col2 property of the object. Therefore, the value of the col2 property is changed in the ontology. At time T12, there is a data source update to delete all the columns against the user edit made at T11. Therefore, the conflict involving all the properties is to be resolved by prioritizing user edits. The object then remains unchanged in the ontology pursuant to Rule (4).

In FIG. 5C, at time T13, there is a data source update to create the row with values for the columns col1, col2, and col3 as well as a user edit to delete the object from the ontology. Therefore, the conflict involving all the properties is to be resolved by prioritizing user edits. Then object then is deleted from the ontology pursuant to Rule (4). At time T14, there is a user edit to modify the object without creating the object, which would fail. Therefore, the object remains deleted from the ontology.

In some embodiments, the conflict resolution strategy is to prioritize data source updates, prioritize the more recent changes, or follow other predetermined logic. The server 102 can be programmed to adopt the same conflict resolution strategy across all object types. Alternatively, the server 102 can be programmed to adopt different conflict resolution strategies for different portions of the ontology, such as a specific conflict resolution strategy for a specific object type, a specific object type and all the sub-object types, or a specific object type and all the linked object types.

3.4. Controlling Ontology Data Permissions

As discussed above, an ontology has objects and links, and each object or link has properties. In addition, each MDO has multiple components corresponding to multiple data sources, where each component includes properties that come from a single one of the multiple data sources. In certain embodiments, different components of an MDO include different properties, thus allowing no duplicity within the object.

In some embodiments, the server 102 is programmed to control access to the ontology at different levels, such as the ontology level, link type level, link level, object type level, object level, component level, or property level. The access control can be defined with respect to a hierarchy of user roles and a set of permissions or access levels.

In some embodiments, the server 102 is programmed to associate each data source with a set of user roles for users or user accounts and corresponding permissions. For example, an ontology owner role has full access including being able to manage permissions, an ontology editor role is less than the owner role by not being able to manage permissions, an ontology viewer role is less than the editor role by not having editing permissions, and an ontology discoverer role is less than the viewer role by only being to see select metadata. In general, each data source leads to a distinct set of object types and link types, and the access control of the data source can determine the access control of the distinct set of object types and link types. In the case of MDOs, multiple data sources lead to an ontology entity type, and the access controls of the data sources can determine the access controls of the multiple components of the ontology entity type. When MDOs are represented in the object databases, such as one with rows and columns, the access controls of the multiple components of each ontology entity type would correspond to column-level access controls.

In some embodiments, the server 102 is programmed to require having permissions to view an entire ontology entity to be able to modify the ontology entity. Therefore, when a user account is granted access by a first data source but not a second data source, the user account would not have access to modify an MDO that originates from both the first data source and the second data source.

In some embodiments, the server 102 is programmed to require permissions as follows for accessing objects of an object type, all properties of which originate from two data sources of D1 and D2. Creating an object of the object type by setting values for the properties that originate from D1 requires only permissions for viewing D1. The values for the properties that originate from D2 could be set to null. Similarly, modifying an object of the object type by setting values for the properties that originate from D1 requires only permissions for viewing D1. Deleting an object of the object type, however, requires permissions for viewing both D1 and D2.

In some embodiments, the server is programmed to require permissions as follows for accessing links of a link type that connects two object types. The first object type has all properties originating from D1, and the second object type has all properties originating from D2. Creating or deleting a link of the link type between a first object of the first object type and a second object of the second object type requires only permissions for viewing the first object and the second object.

In some embodiments, the server 102 is programmed to manage granular policies. With each data source leads to a distinct set of object types and link types, the access control of the data source can apply at not only these levels but also the object level, link level, object property level, or link property level with granular policies. A certain granular policy can restrict access to certain ontology entities to certain user accounts based on certain attribute values of the certain user accounts or certain properties of the certain ontology entities. As a result, only those user accounts having the certain attribute values and those ontology entities having the certain property values would meet the requirements of the certain granular policy, and only the certain user accounts would have access to the certain ontology entities or the certain properties of the certain ontology entities. For example, the certain granular policy can allow user accounts from Europe to see and edit European objects. When ontology entities are represented in the object databases, such as one with rows and columns, the access controls that apply at the ontology entity level would correspond to row-level access controls, and those that apply at the property level would correspond to column-level access controls.

Figure 6:
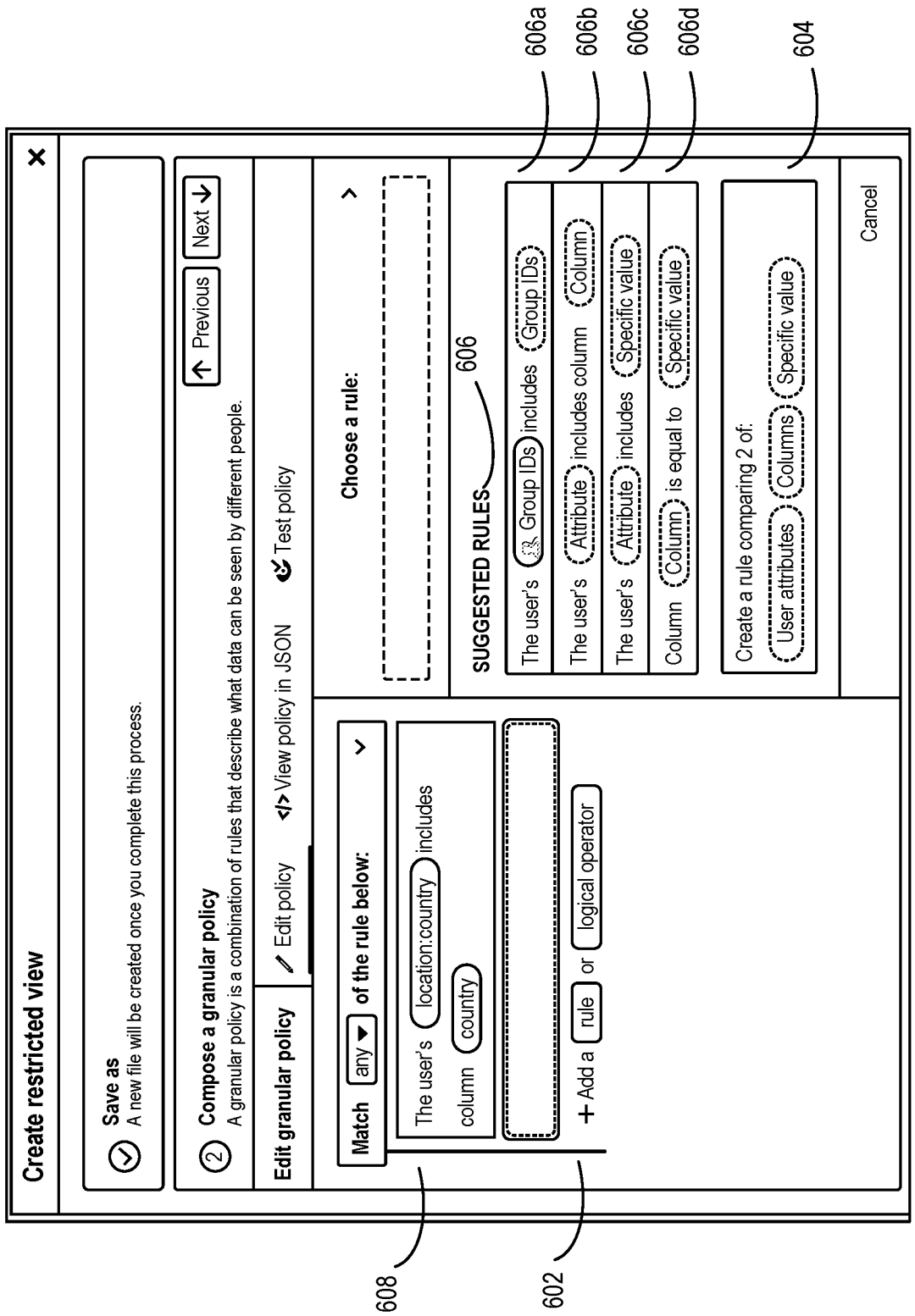
FIG. 6 illustrates an example graphical user interface for creating a granular policy.

FIG. 6 illustrates an example graphical user interface for creating a granular policy. In some embodiments, a granular policy can comprise one or more rules combined by logical operators. An administrator, such as a user in the ontology owner role, can add a rule or logical operator using the buttons in the area 602. For adding a rule, an initial mechanism of choosing two of three items for comparison can be employed in the area 604, and some sample comparisons are listed in the area 606. The initial mechanism allows three types of comparisons. The first type of comparison compares an attribute of a user account ("user attribute") with a specific value, and the rule 606c is an example. The second type of comparison compares a property of an ontology entity ("ontology entity property" corresponding to a column) with a specific value, and the rule 606d is an example. The third type of comparison compares a user attribute with an ontology entity property, and the rule 606a and the rule 606b are examples. The administrator can choose two of the three items in the area 604, specify a relational operator, such as "includes" or "is equal to", and obtain an initial rule, such as the rule 606b. The user can then instantiate each of the items, such as assigning "Group IDs" to the attribute item and "Group IDs" to the column item of the rule 606b, to get the final rule, such as the rule 606a, which indicates that the Group IDs user attribute includes a value that is not manually specified but comes from the "Group IDs ontology entity property.

In some embodiments, a final rule can then be displayed in the area 608, and it can be combined with existing rules using one or more logical operators, such as "any". The default access scope for a specific user in an appropriate user role when a rule is satisfied can be the objects that are compared in the rule or all objects otherwise. For example, the default access scope for the specific user from satisfying the rule 606a can be all objects where the Group IDs property match the Group IDs attribute of the specific user. The default access scope for the specific user from satisfying the rule 606c can be all objects. The default access scope for the specific user from satisfying the rule 606d can be all objects where the specified ontology entity property is equal to the specified value. The default access scope for satisfying a combination of rules can be the intersection of the access scopes of the matched rules. Additional elements can be included in the area 602, the area 604, or another area in the graphical user interface for specifying the access scope when each rule or the combination of rules is satisfied, which can be limited to specific properties of the objects. For example, a certain access scope can be defined to exclude from access those object properties that are being compared in the rules and the values thereof for users in roles that have editing permissions, to reduce disruptions to the application of the rules.

As discussed above, in some embodiments, the granular polices are applied on a per data source basis. The access controls associated with data sources can take precedence over those based on granular policies. For example, an object type might have two properties A and B that come from different data sources. For a specific user, the access controls associated with the data sources can determine that the ontology entity property B is inaccessible. When relevant granular policies are applied, only the ontology entity property A is then available for comparison, and the application result can be that only the ontology entity property A of certain objects are accessible. The presentation of the application result can depend on the exact user roles and permissions. When an ontology entity property is accessible, it can mean that only the metadata of the ontology entity property (e.g., identifier) is accessible, or both the metadata and actual value are accessible. Therefore, in the example, the metadata of the ontology entity property A would be shown and the value of this ontology entity property would be shown for the certain objects to the specific user. On the other hand, the metadata of the ontology entity property B can be shown with no value shown, or alternatively no information regarding the ontology entity property B would be shown depending on the user role of the specific user.

4. EXAMPLE PROCESSES

Figure 7:
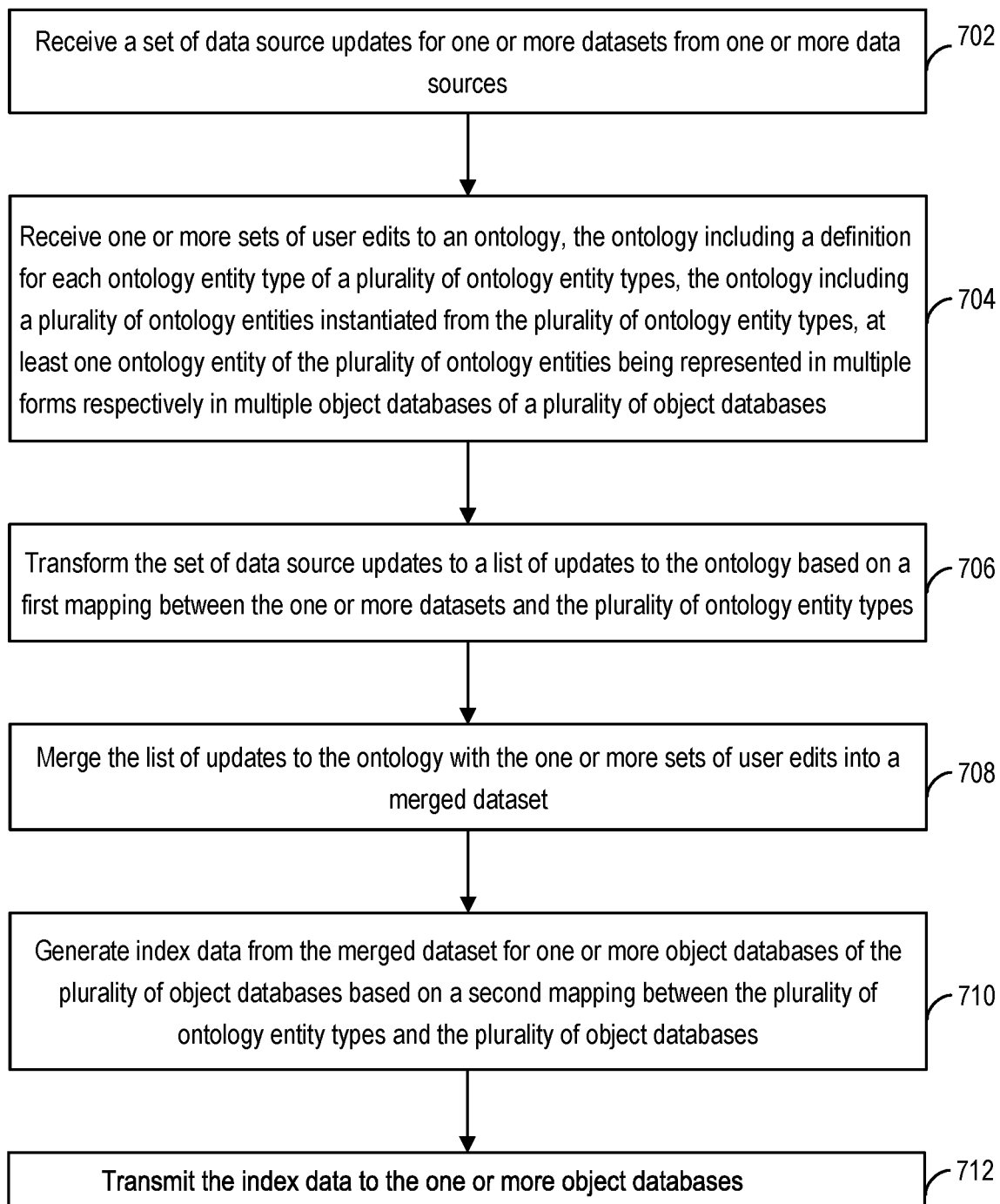
FIG. 7 illustrates an example process of indexing data changes to ontology-based databases in accordance with disclosed embodiments.
Figure 8:
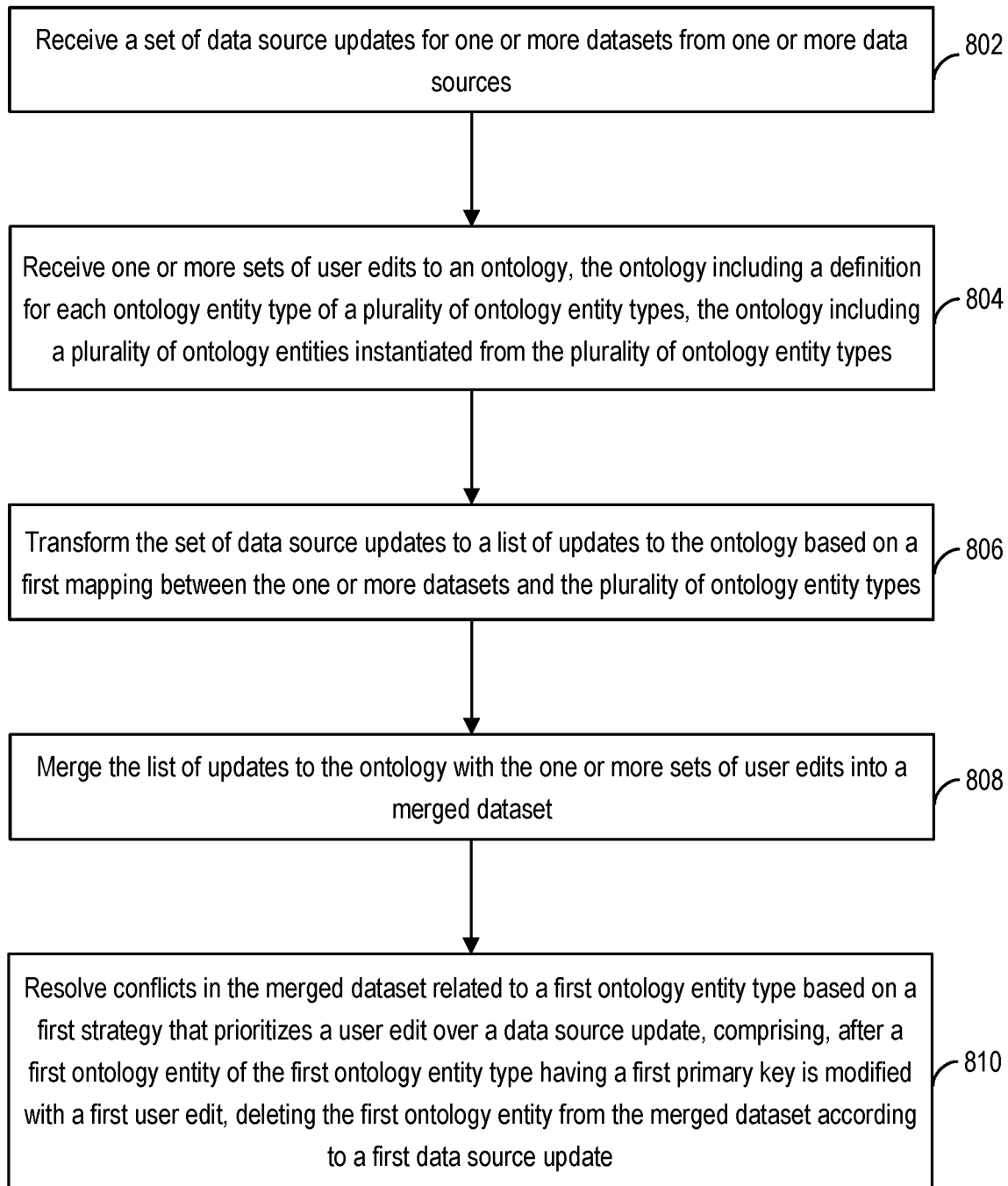
FIG. 8 illustrates a process of resolving conflicts in changes to ontology data in accordance with disclosed embodiments.
Figure 9:
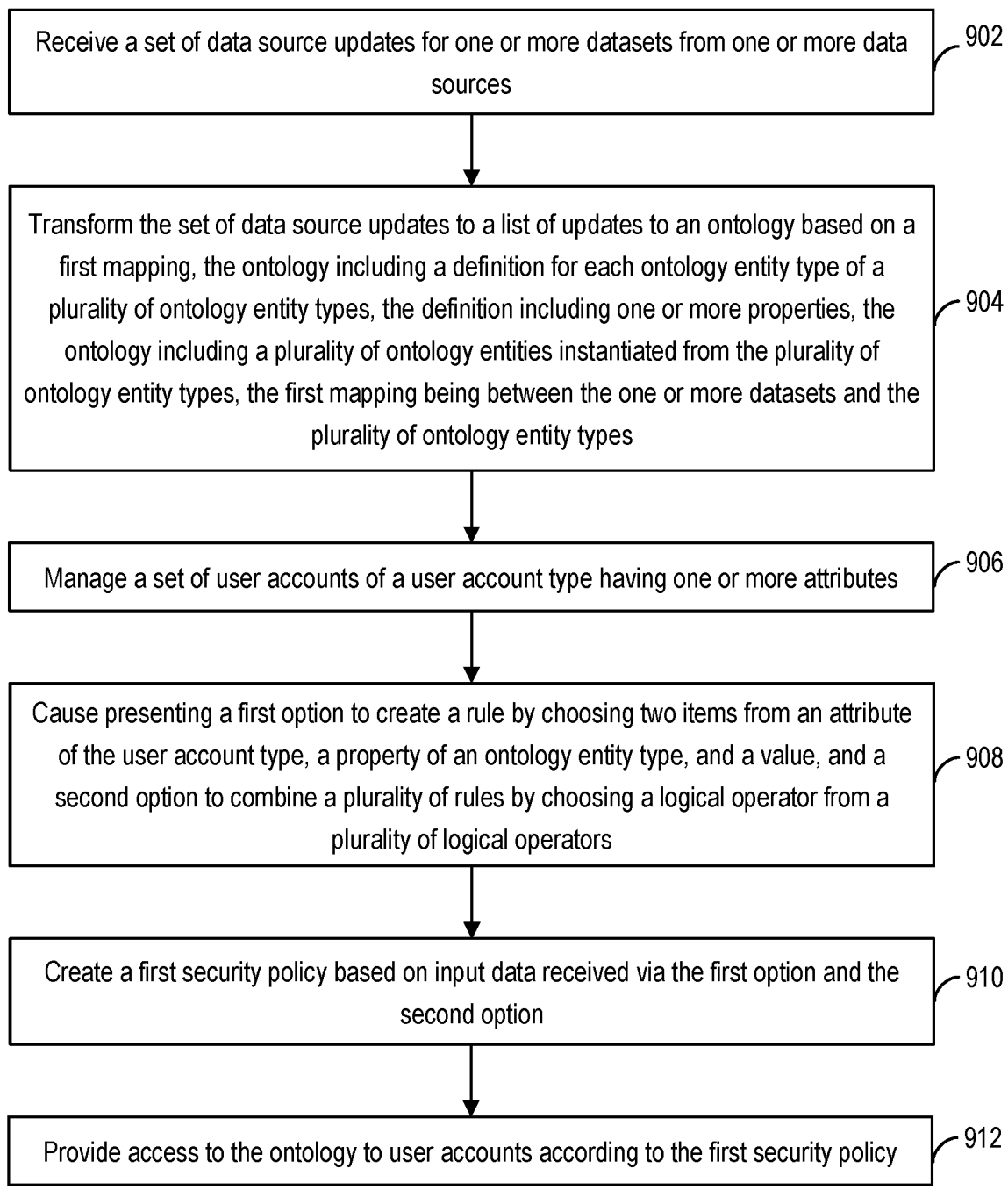
FIG. 9 illustrates a process of managing access control for ontology data in accordance with disclosed embodiments.

Each of FIGS. 7-9 is shown in simplified, schematic format for purposes of illustrating a clear example and other embodiments may include more, fewer, or different elements connected in various manners. Each of FIGS. 7-9 is intended to disclose an algorithm, plan, or outline that can be used to implement one or more computer programs or other software elements which when executed cause performing the functional improvements and technical advances that are described herein. Furthermore, the flow diagrams herein are described at the same level of detail that persons of ordinary skill in the art ordinarily use to communicate with one another about algorithms, plans, or specifications forming a basis of software programs that they plan to code or implement using their accumulated skill and knowledge.

FIG. 7 illustrates an example process of indexing data changes to ontology-based databases in accordance with disclosed embodiments.

In some embodiments, the server 102 is programmed or configured to represent a data source of one or more data sources by a dataset of the one or more datasets. The server 102 is programmed or configured to then add a record to the first mapping that associates the dataset with one or more ontology entity types of the plurality of ontology entity types, and create a transformation between a schema for the dataset and the one or more definitions for the one or more ontology entity types. In addition, the server 102 is programmed or configured to generate one or more ontology entities from the dataset using the transformation.

In step 702, the server 102 is programmed or configured to receive a set of data source updates for one or more datasets from the one or more data sources. In some embodiments, the server 102 is programmed or configured to receive original data from the data source, determine changes to the dataset from the original data, and add the changes to a changelog dataset that represents the set of data source updates.

In step 704, the server 102 is programmed or configured to receive one or more sets of user edits to an ontology. The ontology includes a definition for each ontology entity type of a plurality of ontology entity types and a plurality of ontology entities instantiated from the plurality of ontology entity types. At least one ontology entity of the plurality of ontology entities is represented in multiple forms respectively in multiple object databases of a plurality of object databases.

In some embodiments, an ontology entity is an object or a link between two objects. In certain embodiments, a user edit of the one or more sets of user edits is a change to an ontology entity of the set of ontology entities. Each set of user edits of the one or more sets of user edits is to be applied as a single transaction to a user.

In step 706, the server 102 is programmed or configured to transform the set of data source updates to a list of updates to the ontology based on a first mapping between the one or more datasets and the plurality of ontology entity types. In some embodiments, multiple datasets of the one or more datasets are mapped to a common ontology entity type in the first mapping.

In step 708, the server 102 is programmed or configured to merge the list of updates to the ontology with the one or more sets of user edits into a merged dataset. In some embodiments, the merging comprises joining the changelog dataset noted above and the one or more sets of user edits based on a primary key of a certain ontology entity. The merging further comprises storing the merged dataset in a memory, thereby materializing the one or more sets of user edits. In certain embodiments, the merging is performed when a size of the list of updates or a size of the one or more sets of user edits has exceeded a threshold or when a certain amount of time has passed.

In step 710, the server 102 is programmed or configured to generate index data from the merged dataset for one or more object databases of the plurality of object databases based on a second mapping between the plurality of ontology entity types and the plurality of object databases. In some embodiments, the plurality of object databases includes a graph database and a relational database respectively associated with different data representations and query operations. In certain embodiments, the second mapping associates each ontology entity type with at least one object database of the plurality of object databases.

In some embodiments, the merged dataset includes changes to one or more ontology entities of a set of ontology entity types of the plurality of ontology entity types. The generating comprises, for a specific object database of the plurality of object databases, creating one or more index files from the changes to the one or more ontology entities for the set of ontology entity types that are associated with the specific object database, and the one or more index files are in a specific format required by the specific object database. In certain embodiments, each ontology entity type of the plurality of ontology entity types has one or more properties. The index data associates a value for a property of an ontology entity type of the plurality of ontology entity types with a list of ontology entities of the set of ontology entities.

In step 712, the server 102 is programmed or configured to transmit the index data to the one or more object databases.

FIG. 8 illustrates a process of resolving conflicts in changes to ontology data in accordance with disclosed embodiments.

In step 802, the server 102 is programmed or configured to receive a set of data source updates for one or more datasets from one or more data sources.

In step 804, the server 102 is programmed or configured to receive one or more sets of user edits to an ontology. The ontology includes a definition for each ontology entity type of a plurality of ontology entity types and a plurality of ontology entities instantiated from the plurality of ontology entity types. In some embodiments, an ontology entity is an object or a link between two objects. In certain embodiments, at least one ontology entity of the plurality of ontology entities is represented in multiple forms respectively in multiple object databases of a plurality of object databases.

In step 806, In step 802, the server 102 is programmed or configured to transform the set of data source updates to a list of updates to the ontology based on a first mapping between the one or more datasets and the plurality of ontology entity types.

In step 808, In step 802, the server 102 is programmed or configured to merge the list of updates to the ontology with the one or more sets of user edits into a merged dataset. In some embodiments, the merging is performed when a size of the list of updates to the ontology or a size of the one or more sets of user edits has exceeded a threshold or when a certain amount of time has passed.

In step 810, In step 802, the server 102 is programmed or configured to resolve conflicts in the merged dataset related to a first ontology entity type based on a first strategy that prioritizes a user edit over a data source update, comprising, after a first ontology entity of the first ontology entity type having a first primary key is modified with a first user edit, deleting the first ontology entity from the merged dataset according to a first data source update.

In some embodiments, the resolving further comprising after the deleting, recreating the first ontology entity having the first primary key according a second data source update in the merged dataset, and reapplying the first user edit to the first ontology entity. In certain embodiments, the server 102 is programmed to resolve conflicts in the merged dataset related to each ontology entity type that is a sub-type of the first ontology entity type based on the first strategy. In other embodiments, the server 102 is programmed to resolve conflicts in the merged dataset related to a second ontology entity type based on a second strategy that prioritizes a more recent change to the ontology over a less recent change.

In some embodiments, the server 102 is programmed to resolve conflicts in the merged dataset related to a second ontology entity type by reviewing data in the merged dataset in a chronological order. The server 102 is further programmed to determine that a current user edit to a second ontology entity of the second ontology entity type in the merged dataset is to delete the second ontology entity, and delete the second ontology entity from the merged dataset based on the first strategy.

In some embodiments, the server 102 is further programmed to determine that a current user edit to a third ontology entity of the second ontology entity type in the merged dataset is to create the third ontology entity and an earlier user edit to the third ontology entity was to delete the third ontology entity, and disregard any later data source update to the third ontology entity in the merged dataset.

In some embodiments, the server 102 is further programmed to determine that a current user edit to a fourth ontology entity of the second ontology entity type in the merged dataset is to create the fourth ontology entity and no earlier user edit to the fourth ontology entity was to delete the fourth ontology entity, and disregard any later data source update to the fourth ontology entity in the merged dataset.

In some embodiments, the server 102 is further programmed to determine that a current user edit to a fifth ontology entity of the second ontology entity type in the merged dataset is to modify a property of the fifth ontology entity, no earlier user edit to the fifth ontology entity was to create the fifth ontology entity, and the fifth ontology entity is represented in the one or more datasets, and disregard any later data source update to modify the property of the fifth ontology entity in the merged dataset.

In some embodiments, the server 102 is further programmed to determine that a current user edit to a sixth ontology entity of the second ontology entity type in the merged dataset is to modify a property of the sixth ontology entity, no earlier user edit to the sixth ontology entity was to create the sixth ontology entity, and the sixth ontology entity is not represented in the one or more datasets, and reject the current user edit.

FIG. 9 illustrates a process of managing access control for ontology data FIG. 9 illustrates a process of managing access control for ontology data in accordance with disclosed embodiments.

In step 902, the server 102 is programmed or configured to receive a set of data source updates for one or more datasets from one or more data sources.

In step 904, the server 102 is programmed or configured to transform the set of data source updates to a list of updates to an ontology based on a first mapping. The ontology includes a definition for each ontology entity type of a plurality of ontology entity types, the definition including one or more properties. The ontology also includes a plurality of ontology entities instantiated from the plurality of ontology entity types. The first mapping is between the one or more datasets and the plurality of ontology entity types. In some embodiments, an ontology entity is an object or a link between two objects.

In some embodiments, the server 102 is programmed to represent a data source of the one or more data sources by a dataset of the one or more datasets. The server 102 is also programmed to add a record to the first mapping that associates the dataset with one or more ontology entity types of the plurality of ontology entity types, and create a transformation between a schema for the dataset and one or more definitions for the one or more ontology entity types. In addition, the server 102 is programmed to generate one or more ontology entities from the dataset using the transformation.

In step 906, the server 102 is programmed or configured to manage a set of user accounts of a user account type having one or more attributes. In some embodiments, a specific attribute of the one or more attributes of the user account type corresponds to a user role of plurality of user roles. Each user role is associated with a distinct set of discovering, reading, writing, or administering permissions.

In some embodiments, the server 102 is programmed to receive, for the dataset, a set of permissions controlling access to rows of the dataset by the set of user accounts. The server 102 is also programmed to create a specific security policy that applies to ontology entities of the one or more ontology entity types based on the set of permissions. In certain embodiments, the providing comprises applying the specific security policy before applying the first security policy.

In some embodiments, the server 102 is programmed to create a first transformation mapping columns of a first dataset of the one or more datasets to a first set of properties of a certain ontology entity type of the plurality of ontology entity types, and create a second transformation mapping columns of a second dataset of the one or more datasets to a second set of properties of the certain ontology entity type. The server is programmed to then create a specific security policy that applies to the first set of properties of ontology entities of the certain ontology entity type based on a first set of permissions controlling access to rows of the first dataset by the set of user accounts, and create a particular security policy that applies to the second set of properties of the ontology entities of the certain ontology entity type based on a second set of permissions controlling access to rows of the second dataset by the set of user accounts.

In step 908, the server 102 is programmed or configured to cause presenting a first option to create a rule by choosing two items from an attribute of the user account type, a property of an ontology entity type, and a value, and a second option to combine a plurality of rules by choosing a logical operator from a plurality of logical operators. In some embodiments, the server 102 is programmed to cause presenting a third option to combine the two items by choosing a relational operator from a plurality of relational operators. In certain embodiments, the server 102 is programmed to cause presenting a fourth option to associate one or more permissions with the rule that are granted when the rule applies. In other embodiments, the one or more permissions allow no access to a first property of a specific ontology entity type of the plurality of ontology entity types and allowing access to a second property of the specific ontology entity type.

In step 910, the server 102 is programmed or configured to create a first security policy based on input data received via the first option and the second option. In some embodiments, the creating comprises determining a scope of each rule in the plurality of rules based on the associated one or more permissions, and determining a scope of the plurality of rules in combination based on the scope of each rule and the logical operator.

In step 912, the server 102 is programmed or configured to provide access to the ontology to user accounts according to the first security policy.

In some embodiments, the list of updates to the ontology includes a list of changes to at least one ontology entity of the plurality of ontology entities. The server 102 is further programmed to, for an ontology entity of the at least one ontology entity, represent the list of updates that applies to the ontology entity in multiple forms to generate multiple representations respectively in multiple object databases.

The providing then comprises applying the first security policy equally to the multiple representations.

5. EXAMPLE IMPLEMENTATION

According to one embodiment, the techniques described herein are implemented by at least one computing device. The techniques may be implemented in whole or in part using a combination of at least one server computer and/or other computing devices that are coupled using a network, such as a packet data network. The computing devices may be hard-wired to perform the techniques, or may include digital electronic devices such as at least one application-specific integrated circuit (ASIC) or field programmable gate array (FPGA) that is persistently programmed to perform the techniques, or may include at least one general purpose hardware processor programmed to perform the techniques pursuant to program instructions in firmware, memory, other storage, or a combination. Such computing devices may also combine custom hard-wired logic, ASICs, or FPGAs with custom programming to accomplish the described techniques. The computing devices may be server computers, workstations, personal computers, portable computer systems, handheld devices, mobile computing devices, wearable devices, body mounted or implantable devices, smartphones, smart appliances, internetworking devices, autonomous or semi-autonomous devices such as robots or unmanned ground or aerial vehicles, any other electronic device that incorporates hard-wired and/or program logic to implement the described techniques, one or more virtual computing machines or instances in a data center, and/or a network of server computers and/or personal computers.

Figure 10:
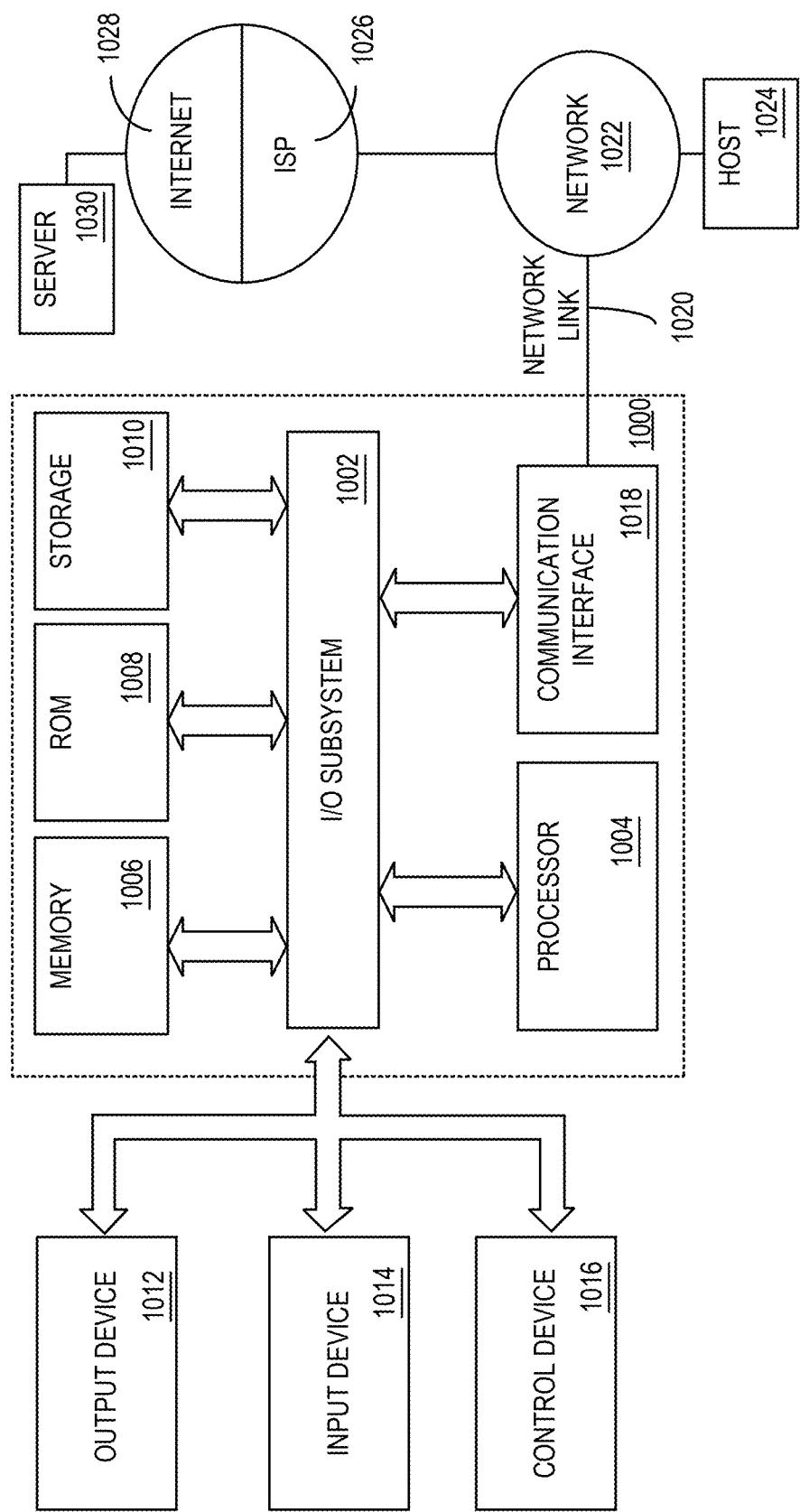
FIG. 10 illustrates a computer system upon which various embodiments may be implemented.

FIG. 10 is a block diagram that illustrates an example computer system with which an embodiment may be implemented. In the example of FIG. 10, a computer system 1000 and instructions for implementing the disclosed technologies in hardware, software, or a combination of hardware and software, are represented schematically, for example as boxes and circles, at the same level of detail that is commonly used by persons of ordinary skill in the art to which this disclosure pertains for communicating about computer architecture and computer systems implementations.

Computer system 1000 includes an input/output (I/O) subsystem 1002 which may include a bus and/or other communication mechanism(s) for communicating information and/or instructions between the components of the computer system 1000 over electronic signal paths. The I/O subsystem 1002 may include an I/O controller, a memory controller and at least one I/O port. The electronic signal paths are represented schematically in the drawings, for example as lines, unidirectional arrows, or bidirectional arrows.

At least one hardware processor 1004 is coupled to I/O subsystem 1002 for processing information and instructions. Hardware processor 1004 may include, for example, a general-purpose microprocessor or microcontroller and/or a special-purpose microprocessor such as an embedded system or a graphics processing unit (GPU) or a digital signal processor or Advanced RISC Machines (ARM) processor. Processor 1004 may comprise an integrated arithmetic logic unit (ALU) or may be coupled to a separate ALU.

Computer system 1000 includes one or more units of memory 1006, such as a main memory, which is coupled to I/O subsystem 1002 for electronically digitally storing data and instructions to be executed by processor 1004. Memory 1006 may include volatile memory such as various forms of random-access memory (RAM) or other dynamic storage device. Memory 1006 also may be used for storing temporary variables or other intermediate information during execution of instructions to be executed by processor 1004. Such instructions, when stored in non-transitory computer-readable storage media accessible to processor 1004, can render computer system 1000 into a special-purpose machine that is customized to perform the operations specified in the instructions.

Computer system 1000 further includes non-volatile memory such as read only memory (ROM) 1008 or other static storage device coupled to I/O subsystem 1002 for storing information and instructions for processor 1004. The ROM 1008 may include various forms of programmable ROM (PROM) such as erasable PROM (EPROM) or electrically erasable PROM (EEPROM). A unit of persistent storage 1010 may include various forms of non-volatile RAM (NVRAM), such as flash memory, or solid-state storage, magnetic disk, or optical disk such as CD-ROM or DVD-ROM, and may be coupled to I/O subsystem 1002 for storing information and instructions. Storage 1010 is an example of a non-transitory computer-readable medium that may be used to store instructions and data which when executed by the processor 1004 cause performing computer-implemented methods to execute the techniques herein.

The instructions in memory 1006, ROM 1008 or storage 1010 may comprise one or more sets of instructions that are organized as modules, methods, objects, functions, routines, or calls. The instructions may be organized as one or more computer programs, operating system services, or application programs including mobile apps. The instructions may comprise an operating system and/or system software; one or more libraries to support multimedia, programming or other functions; data protocol instructions or stacks to implement Transmission Control Protocol/Internet Protocol (TCP/IP), Hypertext Transfer Protocol (HTTP) or other communication protocols; file processing instructions to interpret and render files coded using HTML, XML, Joint Photographic Experts Group (JPEG), Moving Picture Experts Group (MPEG) or Portable Network Graphics (PNG); user interface instructions to render or interpret commands for a GUI, command-line interface or text user interface; application software such as an office suite, internet access applications, design and manufacturing applications, graphics applications, audio applications, software engineering applications, educational applications, games or miscellaneous applications. The instructions may implement a web server, web application server or web client. The instructions may be organized as a presentation layer, application layer and data storage layer such as a relational database system using structured query language (SQL) or NoSQL, an object store, a graph database, a flat file system or other data storage.

Computer system 1000 may be coupled via I/O subsystem 1002 to at least one output device 1012. In one embodiment, output device 1012 is a digital computer display. Examples of a display that may be used in various embodiments include a touch screen display or a light-emitting diode (LED) display or a liquid crystal display (LCD) or an e-paper display. Computer system 1000 may include other type(s) of output devices 1012, alternatively or in addition to a display device. Examples of other output devices 1012 include printers, ticket printers, plotters, projectors, sound cards or video cards, speakers, buzzers or piezoelectric devices or other audible devices, lamps or LED or LCD indicators, haptic devices, actuators, or servos.

At least one input device 1014 is coupled to I/O subsystem 1002 for communicating signals, data, command selections or gestures to processor 1004. Examples of input devices 1014 include touch screens, microphones, still and video digital cameras, alphanumeric and other keys, keypads, keyboards, graphics tablets, image scanners, joysticks, clocks, switches, buttons, dials, slides, and/or various types of sensors such as force sensors, motion sensors, heat sensors, accelerometers, gyroscopes, and inertial measurement unit (IMU) sensors and/or various types of transceivers such as wireless, such as cellular or Wi-Fi, radio frequency (RF) or infrared (IR) transceivers and Global Positioning System (GPS) transceivers.

Another type of input device is a control device 1016, which may perform cursor control or other automated control functions such as navigation in a graphical interface on a display screen, alternatively or in addition to input functions. Control device 1016 may be a touchpad, a mouse, a trackball, or cursor direction keys for communicating direction information and command selections to processor 1004 and for controlling cursor movement on the output device 1012. The input device may have at least two degrees of freedom in two axes, a first axis (e.g., x) and a second axis (e.g., y), that allows the device to specify positions in a plane. Another type of input device is a wired, wireless, or optical control device such as a joystick, wand, console, steering wheel, pedal, gearshift mechanism or other type of control device. An input device 1014 may include a combination of multiple different input devices, such as a video camera and a depth sensor.

In another embodiment, computer system 1000 may comprise an internet of things (IoT) device in which one or more of the output device 1012, input device 1014, and control device 1016 are omitted. Or, in such an embodiment, the input device 1014 may comprise one or more cameras, motion detectors, thermometers, microphones, seismic detectors, other sensors or detectors, measurement devices or encoders and the output device 1012 may comprise a special-purpose display such as a single-line LED or LCD display, one or more indicators, a display panel, a meter, a valve, a solenoid, an actuator or a servo.

When computer system 1000 is a mobile computing device, input device 1014 may comprise a global positioning system (GPS) receiver coupled to a GPS module that is capable of triangulating to a plurality of GPS satellites, determining and generating geo-location or position data such as latitude-longitude values for a geophysical location of the computer system 1000. Output device 1012 may include hardware, software, firmware, and interfaces for generating position reporting packets, notifications, pulse or heartbeat signals, or other recurring data transmissions that specify a position of the computer system 1000, alone or in combination with other application-specific data, directed toward host computer 1024 or server 1030.

Computer system 1000 may implement the techniques described herein using customized hard-wired logic, at least one ASIC or FPGA, firmware and/or program instructions or logic which when loaded and used or executed in combination with the computer system causes or programs the computer system to operate as a special-purpose machine. According to one embodiment, the techniques herein are performed by computer system 1000 in response to processor 1004 executing at least one sequence of at least one instruction contained in main memory 1006. Such instructions may be read into main memory 1006 from another storage medium, such as storage 1010. Execution of the sequences of instructions contained in main memory 1006 causes processor 1004 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical or magnetic disks, such as storage 1010. Volatile media includes dynamic memory, such as memory 1006. Common forms of storage media include, for example, a hard disk, solid state drive, flash drive, magnetic data storage medium, any optical or physical data storage medium, memory chip, or the like.

Storage media is distinct from but may be used in conjunction with transmission media. Transmission media participates in transferring information between storage media. For example, transmission media includes coaxial cables, copper wire and fiber optics, including the wires that comprise a bus of I/O subsystem 1002. Transmission media can also take the form of acoustic or light waves, such as those generated during radio-wave and infra-red data communications.

Various forms of media may be involved in carrying at least one sequence of at least one instruction to processor 1004 for execution. For example, the instructions may initially be carried on a magnetic disk or solid-state drive of a remote computer. The remote computer can load the instructions into its dynamic memory and send the instructions over a communication link such as a fiber optic or coaxial cable or telephone line using a modem. A modem or router local to computer system 1000 can receive the data on the communication link and convert the data to be read by computer system 1000. For instance, a receiver such as a radio frequency antenna or an infrared detector can receive the data carried in a wireless or optical signal and appropriate circuitry can provide the data to I/O subsystem 1002 such as place the data on a bus. I/O subsystem 1002 carries the data to memory 1006, from which processor 1004 retrieves and executes the instructions. The instructions received by memory 1006 may optionally be stored on storage 1010 either before or after execution by processor 1004.

Computer system 1000 also includes a communication interface 1018 coupled to I/O subsystem 1002. Communication interface 1018 provides a two-way data communication coupling to network link(s) 1020 that are directly or indirectly connected to at least one communication network, such as a network 1022 or a public or private cloud on the Internet. For example, communication interface 1018 may be an Ethernet networking interface, integrated-services digital network (ISDN) card, cable modem, satellite modem, or a modem to provide a data communication connection to a corresponding type of communications line, for example an Ethernet cable or a metal cable of any kind or a fiber-optic line or a telephone line. Network 1022 broadly represents a LAN, WAN, campus network, internetwork, or any combination thereof. Communication interface 1018 may comprise a LAN card to provide a data communication connection to a compatible LAN, or a cellular radiotelephone interface that is wired to send or receive cellular data according to cellular radiotelephone wireless networking standards, or a satellite radio interface that is wired to send or receive digital data according to satellite wireless networking standards. In any such implementation, communication interface 1018 sends and receives electrical, electromagnetic, or optical signals over signal paths that carry digital data streams representing various types of information.

Network link 1020 typically provides electrical, electromagnetic, or optical data communication directly or through at least one network to other data devices, using, for example, satellite, cellular, Wi-Fi, or BLUETOOTH technology. For example, network link 1020 may provide a connection through a network 1022 to a host computer 1024.

Furthermore, network link 1020 may provide a connection through network 1022 or to other computing devices via internetworking devices and/or computers that are operated by an Internet Service Provider (ISP) 1026. ISP 1026 provides data communication services through a world-wide packet data communication network represented as internet 1028. A server 1030 may be coupled to internet 1028. Server 1030 broadly represents any computer, data center, virtual machine, or virtual computing instance with or without a hypervisor, or computer executing a containerized program system such as DOCKER or KUBERNETES. Server 1030 may represent an electronic digital service that is implemented using more than one computer or instance and that is accessed and used by transmitting web services requests, Uniform Resource Locator (URL) strings with parameters in HTTP payloads, API calls, app services calls, or other service calls. Computer system 1000 and server 1030 may form elements of a distributed computing system that includes other computers, a processing cluster, server farm or other organization of computers that cooperate to perform tasks or execute applications or services. Server 1030 may comprise one or more sets of instructions that are organized as modules, methods, objects, functions, routines, or calls. The instructions may be organized as one or more computer programs, operating system services, or application programs including mobile apps. The instructions may comprise an operating system and/or system software; one or more libraries to support multimedia, programming or other functions; data protocol instructions or stacks to implement TCP/IP, HTTP or other communication protocols; file format processing instructions to interpret or render files coded using HTML, XML, JPEG, MPEG or PNG; user interface instructions to render or interpret commands for a GUI, command-line interface or text user interface; application software such as an office suite, internet access applications, design and manufacturing applications, graphics applications, audio applications, software engineering applications, educational applications, games or miscellaneous applications. Server 1030 may comprise a web application server that hosts a presentation layer, application layer and data storage layer such as a relational database system using SQL or NoSQL, an object store, a graph database, a flat file system or other data storage.

Computer system 1000 can send messages and receive data and instructions, including program code, through the network(s), network link 1020 and communication interface 1018. In the Internet example, a server 1030 might transmit a requested code for an application program through Internet 1028, ISP 1026, local network 1022 and communication interface 1018. The received code may be executed by processor 1004 as it is received, and/or stored in storage 1010, or other non-volatile storage for later execution.

The execution of instructions as described in this section may implement a process in the form of an instance of a computer program that is being executed, and consisting of program code and its current activity. Depending on the operating system (OS), a process may be made up of multiple threads of execution that execute instructions concurrently. In this context, a computer program is a passive collection of instructions, while a process may be the actual execution of those instructions. Several processes may be associated with the same program; for example, opening up several instances of the same program often means more than one process is being executed. Multitasking may be implemented to allow multiple processes to share processor 1004. While each processor 1004 or core of the processor executes a single task at a time, computer system 1000 may be programmed to implement multitasking to allow each processor to switch between tasks that are being executed without having to wait for each task to finish. In an embodiment, switches may be performed when tasks perform input/output operations, when a task indicates that it can be switched, or on hardware interrupts. Time-sharing may be implemented to allow fast response for interactive user applications by rapidly performing context switches to provide the appearance of concurrent execution of multiple processes simultaneously. In an embodiment, for security and reliability, an operating system may prevent direct communication between independent processes, providing strictly mediated and controlled inter-process communication functionality.

6. EXTENSIONS AND ALTERNATIVES

In the foregoing specification, embodiments of the disclosure have been described with reference to numerous specific details that may vary from implementation to implementation. The specification and drawings are, accordingly, to be regarded in an illustrative rather than a restrictive sense. The sole and exclusive indicator of the scope of the disclosure, and what is intended by the applicants to be the scope of the disclosure, is the literal and equivalent scope of the set of claims that issue from this application, in the specific form in which such claims issue, including any subsequent correction.

What is claimed is:
1. A computer-implemented method of managing access control for ontology data, comprising:
receiving a set of data source updates for one or more datasets from one or more data sources;
transforming the set of data source updates to a list of updates to an ontology based on a first mapping,
the ontology including a definition for each ontology entity type of a plurality of ontology entity types, the definition including one or more properties,
the ontology including a plurality of ontology entities instantiated from the plurality of ontology entity types,
an ontology entity being an object or a link between two objects,
the first mapping being between the one or more datasets and the plurality of ontology entity types;
managing a set of user accounts of a user account type having one or more attributes;
causing presenting a first option including three items,
the first option allowing creating a rule by choosing two items from the three items,
the three items being an attribute of the user account type, a property of an ontology entity type, and a value;
receiving a selection of the first option to create one or more rules;
creating a first security policy based on the one or more rules;
providing access to the ontology to user accounts according to the first security policy, wherein the method is performed by one or more processors.

2. The computer-implemented method of claim 1, further comprising:
- representing a data source of the one or more data sources by a dataset of the one or more datasets;
- adding a record to the first mapping that associates the dataset with one or more ontology entity types of the plurality of ontology entity types;
- creating a transformation between a schema for the dataset and one or more definitions for the one or more ontology entity types;
- generating one or more ontology entities from the dataset using the transformation.

3. The computer-implemented method of claim 2, further comprising:
- receiving, for the dataset, a set of permissions controlling access to rows of the dataset by the set of user accounts;
- creating a specific security policy that applies to ontology entities of the one or more ontology entity types based on the set of permissions.

4. The computer-implemented method of claim 3, the providing comprising applying the specific security policy before applying the first security policy.

5. The computer-implemented method of claim 2, further comprising:
- creating a first transformation mapping columns of a first dataset of the one or more datasets to a first set of properties of a certain ontology entity type of the plurality of ontology entity types;
- creating a second transformation mapping columns of a second dataset of the one or more datasets to a second set of properties of the certain ontology entity type;
- creating a specific security policy that applies to the first set of properties of ontology entities of the certain ontology entity type based on a first set of permissions controlling access to rows of the first dataset by the set of user accounts;
- creating a particular security policy that applies to the second set of properties of the ontology entities of the certain ontology entity type based on a second set of permissions controlling access to rows of the second dataset by the set of user accounts.

6. The computer-implemented method of claim 1, further comprising causing presenting a third option to combine the two items by choosing a relational operator from a plurality of relational operators.

7. The computer-implemented method of claim 1, further comprising causing presenting a fourth option to associate one or more permissions with the rule that are granted when the rule applies.

8. The computer-implemented method of claim 7, the one or more permissions allowing no access to a first property of a specific ontology entity type of the plurality of ontology entity types and allowing access to a second property of the specific ontology entity type.

9. The computer-implemented method of claim 7, the creating comprising:
- determining a scope of each rule in a plurality of rules based on the associated one or more permissions;
- determining a scope of the plurality of rules in combination based on the scope of each rule and a logical operator.

10. The computer-implemented method of claim 1,
- a specific attribute of the one or more attributes of the user account type corresponding to a user role of plurality of user roles,
- each user role being associated with a distinct set of discovering, reading, writing, or administering permissions.

11. The computer-implemented method of claim 1,
- the list of updates to the ontology including a list of changes to at least one ontology entity of the plurality of ontology entities,
- the method further comprising, for an ontology entity of the at least one ontology entity, representing the list of updates that applies to the ontology entity in multiple forms to generate multiple representations respectively in multiple object databases,
- the providing comprising applying the first security policy equally to the multiple representations.

12. A system for managing access control for ontology data, comprising:
- a memory;
- one or more processors coupled to the memory and configured to perform:
- receiving a set of data source updates for one or more datasets from one or more data sources;
- transforming the set of data source updates to a list of updates to an ontology based on a first mapping,
- the ontology including a definition for each ontology entity type of a plurality of ontology entity types, the definition including one or more properties,
- the ontology including a plurality of ontology entities instantiated from the plurality of ontology entity types,
- an ontology entity being an object or a link between two objects,
- the first mapping being between the one or more datasets and the plurality of ontology entity types;
- managing a set of user accounts of a user account type having one or more attributes;
- causing presenting a first option including three items,
- the first option allowing creating a rule by choosing two items from the three items,
- the three items being an attribute of the user account type, a property of an ontology entity type, and a value;
- receiving a selection of the first option to create one or more rules;
- creating a first security policy based on the one or more rules;
- providing access to the ontology to user accounts according to the first security policy.

13. The system of claim 12, the one or more processors further configured to perform:
- representing a data source of the one or more data sources by a dataset of the one or more datasets;
- adding a record to the first mapping that associates the dataset with one or more ontology entity types of the plurality of ontology entity types;
- creating a transformation between a schema for the dataset and one or more definitions for the one or more ontology entity types;
- generating one or more ontology entities from the dataset using the transformation.

14. The system of claim 13, the one or more processors further configured to perform:
- receiving, for the dataset, a set of permissions controlling access to rows of the dataset by the set of user accounts;
- creating a specific security policy that applies to ontology entities of the one or more ontology entity types based on the set of permissions.

15. The system of claim 13, the one or more processors further configured to perform:

creating a first transformation mapping columns of a first dataset of the one or more datasets to a first set of properties of a certain ontology entity type of the plurality of ontology entity types;
creating a second transformation mapping columns of a second dataset of the one or more datasets to a second set of properties of the certain ontology entity type;
creating a specific security policy that applies to the first set of properties of ontology entities of the certain ontology entity type based on a first set of permissions controlling access to rows of the first dataset by the set of user accounts;
creating a particular security policy that applies to the second set of properties of the ontology entities of the certain ontology entity type based on a second set of permissions controlling access to rows of the second dataset by the set of user accounts.

16. The system of claim 12, the one or more processors further configured to perform causing presenting a fourth option to associate one or more permissions with the rule that are granted when the rule applies.

17. The system of claim 16, the one or more permissions allowing no access to a first property of a specific ontology entity type of the plurality of ontology entity types and allowing access to a second property of the specific ontology entity type.

18. The system of claim 12,
the list of updates to the ontology including a list of changes to at least one ontology entity of the plurality of ontology entities,
the one or more processors further configured to perform, for an ontology entity of the at least one ontology entity, representing the list of updates that applies to the ontology entity in multiple forms to generate multiple representations respectively in multiple object databases,
the providing comprising applying the first security policy equally to the multiple representations.

19. A non-transitory, computer-readable storage medium storing one or more sequences of instructions which when executed cause one or more processors to perform:
receiving a set of data source updates for one or more datasets from one or more data sources;
transforming the set of data source updates to a list of updates to an ontology based on a first mapping,
the ontology including a definition for each ontology entity type of a plurality of ontology entity types, the definition including one or more properties,
the ontology including a plurality of ontology entities instantiated from the plurality of ontology entity types,
an ontology entity being an object or a link between two objects,
the first mapping being between the one or more datasets and the plurality of ontology entity types;
managing a set of user accounts of a user account type having one or more attributes;
causing presenting a first option including three items,
the first option allowing creating a rule by choosing two items from the three items,
the three items being an attribute of the user account type, a property of an ontology entity type, and a value;
receiving a selection of the first option to create one or more rules;
creating a first security policy based on the one or more rules;
providing access to the ontology to user accounts according to the first security policy.

20. The computer-implemented method of claim 1, further comprising
causing presenting a second option allowing combining a plurality of rules by choosing a logical operator from a plurality of logical operators;
receiving a selection of the second option to create the one or more rules.

* * * * *